`US007325110B2`

(12) United States Patent
Kubo et al.

(10) Patent No.: US 7,325,110 B2
(45) Date of Patent: Jan. 29, 2008

(54) METHOD FOR ACQUIRING SNAPSHOT

(75) Inventors: Kei Kubo, Yokohama (JP); Koji Sugiyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 47 days.

(21) Appl. No.: 10/927,137

(22) Filed: Aug. 27, 2004

(65) Prior Publication Data
US 2005/0138312 A1    Jun. 23, 2005

(30) Foreign Application Priority Data
Dec. 19, 2003 (JP) ............................. 2003-421955
Jul. 9, 2004   (JP) ............................. 2004-202564

(51) Int. Cl.
*G06F 12/00* (2006.01)
*G06F 12/16* (2006.01)

(52) U.S. Cl. .................. 711/162; 711/161; 711/147; 711/100

(58) Field of Classification Search ........ 707/200–205; 709/213–223; 710/22, 105; 714/4–7; 711/111–170
See application file for complete search history.

(56) References Cited
U.S. PATENT DOCUMENTS

| | | | |
|---|---|---|---|
| 6,092,066 A * | 7/2000 | Ofek ............................. | 707/10 |
| 6,182,198 B1 * | 1/2001 | Hubis et al. ................. | 711/162 |
| 6,341,341 B1 * | 1/2002 | Grummon et al. .......... | 711/162 |
| 6,618,794 B1 * | 9/2003 | Sicola et al. ................ | 711/154 |
| 6,668,264 B1 | 12/2003 | Patterson et al. | |
| 2003/0140070 A1 * | 7/2003 | Kaczmarski et al. ........ | 707/204 |
| 2003/0204597 A1 | 10/2003 | Arakawa et al. | |
| 2005/0027748 A1 | 2/2005 | Kisley | |
| 2005/0097289 A1 | 5/2005 | Burton et al. | |

FOREIGN PATENT DOCUMENTS

JP        11-120055        4/1999

OTHER PUBLICATIONS

Handy, J., "The Cache Memory Book", 1998, Academic Press Inc, 2nd ed., pp. 142-143.*
Chervenak, A. Vellanki,V. and Kurmas, Z., "Protecting file systems: A survey of backup techniques", 1998, In Proceedings of the Joint NASA and IEEE Mass Storage Conference (1998)□□.*

(Continued)

*Primary Examiner*—Sanjiv Shah
*Assistant Examiner*—Sam Dillon
(74) *Attorney, Agent, or Firm*—Mattingly, Stanger, Malur & Brundidge, P.C.

(57) ABSTRACT

In a storage switch to control a snapshot operation in the file unit, the delay in the writing operation of a host due to a data saving operation is prevented. In a snapshot acquiring method, the memory usage in a switch is reduced to create a snapshot. The storage switch includes a function to create a snapshot of a file. To prevent occurrence of delay due to the data saving operation, a mirror of source data as a snapshot target is kept in a source volume in any situation or according to a predetermined condition with synchronization established between the mirror and the source data. In the creation of the snapshot, the mirror data is used. By creating the mirror data in sequential positions in the source volume, the positional correspondence between the source side and the snapshot side is simplified.

20 Claims, 15 Drawing Sheets

OTHER PUBLICATIONS

Tanenbaum, A.S. Structured computer organization. 1984. Prentice-Hall, Inc. 2nd ed. pp. 10-12.*

Rusling, D.A. The Linux Kernel. Chapter 9: The File system. Archive.org date Jul. 10, 2001. http://www.linuxhq.com/guides/TLK/fs/filesystem.html.*

M. K. McKusick, W. N. Joy, S. J. Leffler, and R. S. Fabry. A fast file system for UNIX. Computer Systems, 2(3):181-197, 1984.*

"Veritas Data Availability Solution", http://eval.veritas.com/jp/products/wp ebusiness 010823.pdf.

* cited by examiner

FIG. 12A
FIG. 12B
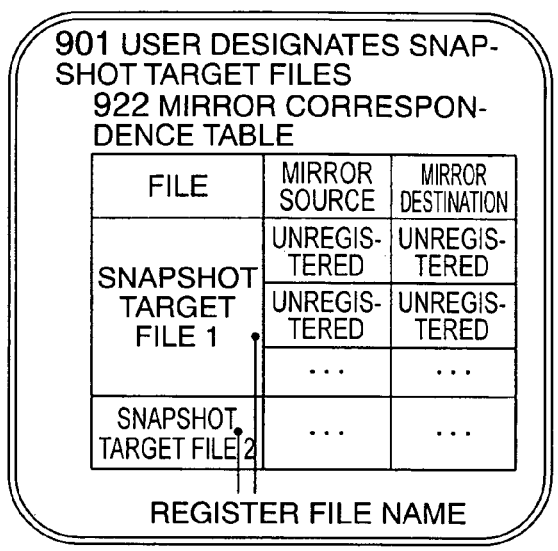
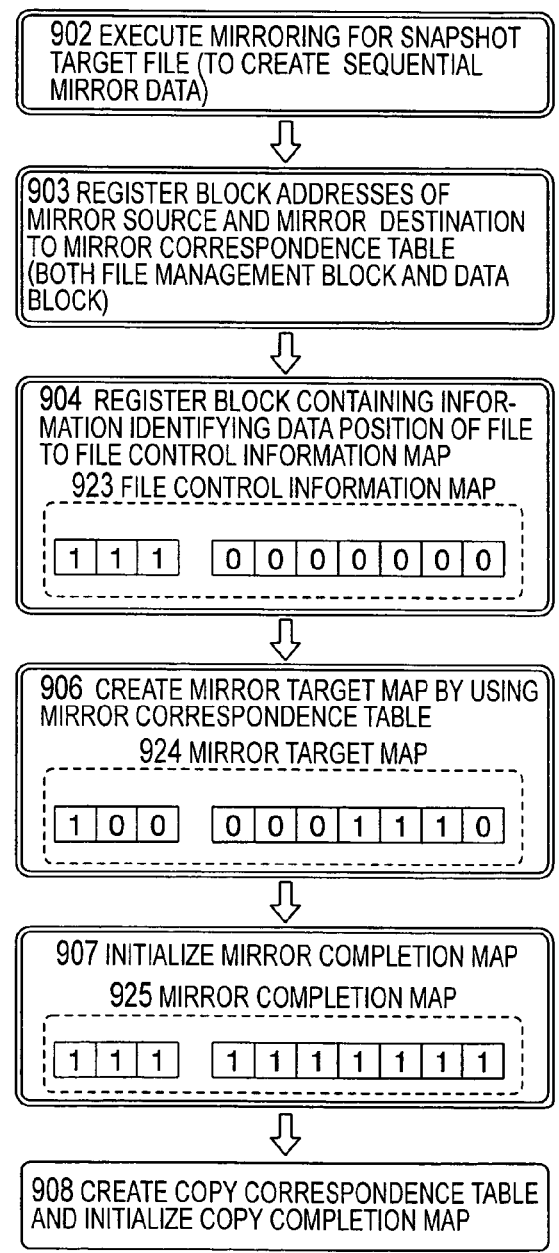
 OPERATION BY SWITCH
 OPERATION BY EXTERNAL CONTROL SERVER FIG. 13A
FIG. 13B
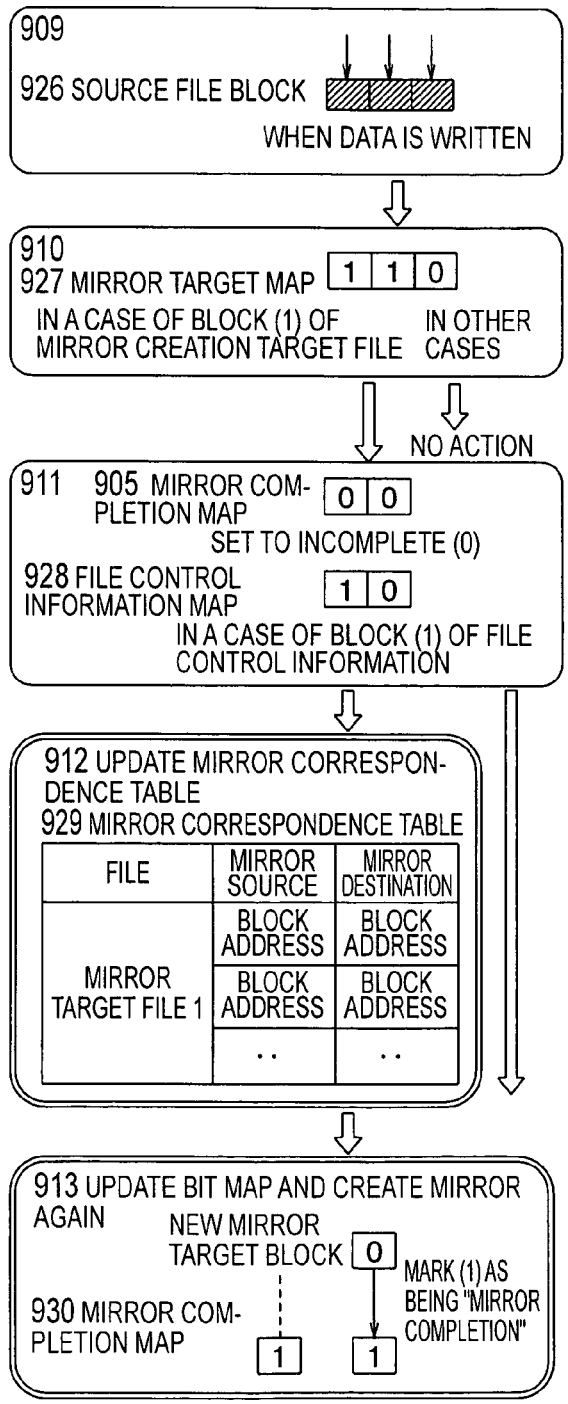
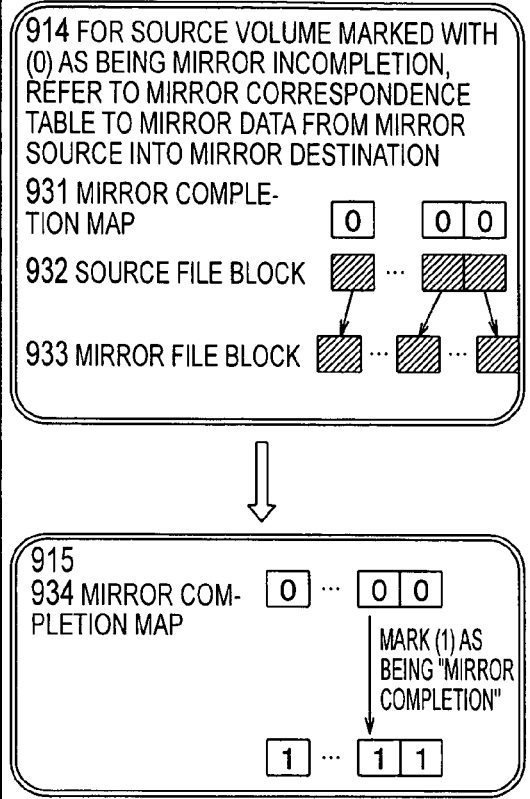

FIG. 14A

916 COPY MIRROR DATA FROM SOURCE SIDE ONTO SNAPSHOT SIDE USING COPY CORRESPONDENCE TABLE AND UPDATE COPY COMPLETION MAP ON SOURCE SIDE (ALL DATA IS NOT COPIED, A PART OF DATA IS COPIED)

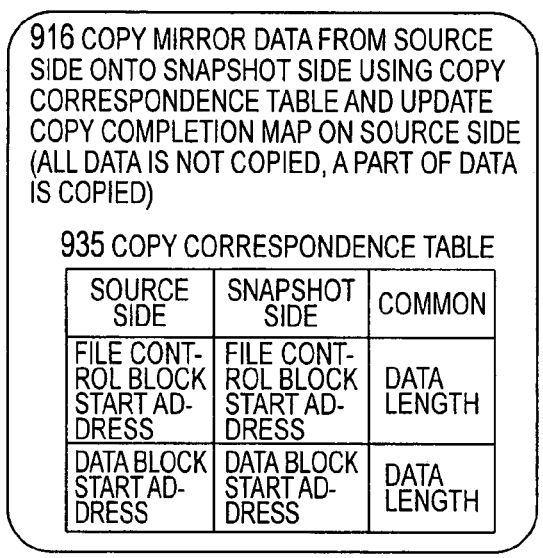

935 COPY CORRESPONDENCE TABLE

| SOURCE SIDE | SNAPSHOT SIDE | COMMON |
|---|---|---|
| FILE CONTROL BLOCK START ADDRESS | FILE CONTROL BLOCK START ADDRESS | DATA LENGTH |
| DATA BLOCK START ADDRESS | DATA BLOCK START ADDRESS | DATA LENGTH |

917 SYNCHRONIZE COPY COMPLETION TABLE OF SWITCH ON SNAPSHOT SIDE WITH THAT ON SOURCE SIDE

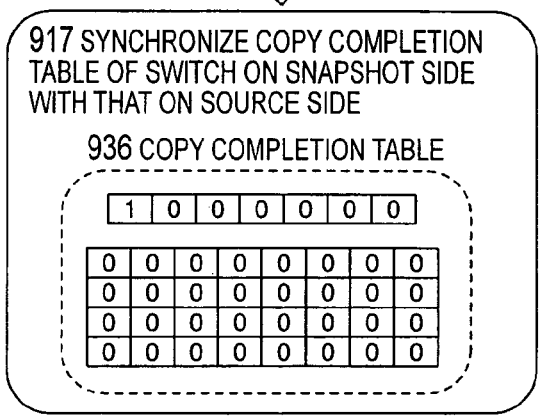

936 COPY COMPLETION TABLE

 OPERATION BY SWITCH

 OPERATION BY EXTERNAL CONTROL SERVER

FIG. 14B

918 AT OCCURRENCE OF READ REQUEST FROM SNAPSHOT HOST TO SNAPSHOT SIDE, SWITCH ACCESSES BY USING COPY COMPLETION MAP TO DETERMINE WHETHER OR NOT COPY HAS BEEN COMPLETED

937 COPY COMPLETION MAP  [1｜0]  IN A CASE OF COPY COMPLETION    IN OTHER CASES

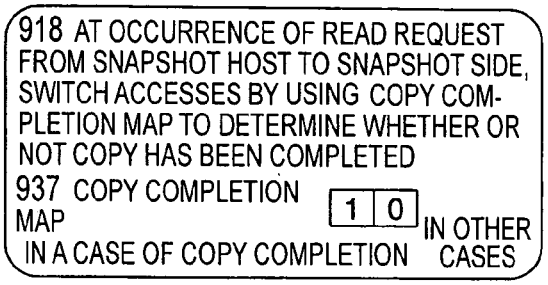

919

938 SNAPSHOT FILE BLOCKS

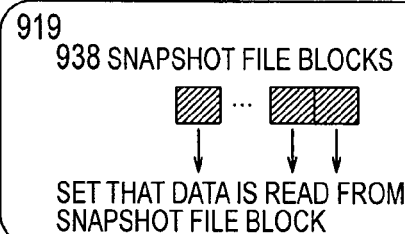

SET THAT DATA IS READ FROM SNAPSHOT FILE BLOCK

920

939 MIRROR FILE BLOCK

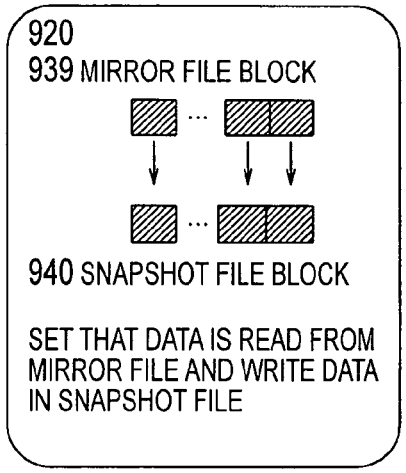

940 SNAPSHOT FILE BLOCK

SET THAT DATA IS READ FROM MIRROR FILE AND WRITE DATA IN SNAPSHOT FILE

921

941 COPY COMPLETION MAP

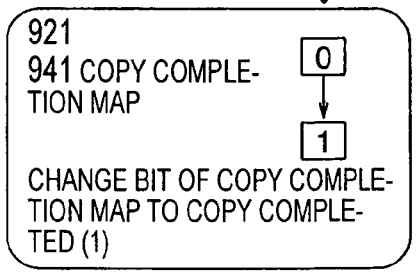

CHANGE BIT OF COPY COMPLETION MAP TO COPY COMPLETED (1)

METHOD FOR ACQUIRING SNAPSHOT

INCORPORATION BY REFERENCE

The present application claims priority from Japanese application JP-2003-421955 filed on Dec. 19, 2003, the content of which is hereby incorporated by reference into this application.

BACKGROUND OF THE INVENTION

The present invention relates to a method of producing backup data in a storage by use of a snapshot operation, and in particular, to a storage switch and a snapshot switching method to conduct a snapshot control operation suitable for creating a snapshot of designated data.

Conventionally, the methods of creating snapshot data include, for example, a split-mirror method in which one of two disks used in the mirroring operation is separated and a copy-on-write method in which a difference of a file before and after an update operation of the file is copied. In the copy-on-write method, even when an associated instruction is issued, the difference is not actually copied in a complete form. The system conducts operation as if a copy is virtually created. When a host accesses the virtual copy, source data of the virtual copy is actually referred to. Consequently, it seems for the user as if the host instantaneously obtains the snapshot. When a host issues a request to update source data, the system temporarily stops execution of the update request to a source volume. In a snapshot volume, the system saves the data of an area as a target of the update operation to the snapshot volume at the issuance of a snapshot creation instruction. Only after the data is saved in the snapshot volume, the system reflects the update operation in the source data. Therefore, for the host to conduct a writing operation in the source data, there occurs delay if the source data has not been saved in the snapshot volume.

JP-A-11-120055 describes a method of acquiring snapshot in which a computer system is proposed to efficiently acquire snapshot. A conventional snapshot acquiring method using the copy-on-write scheme is described, for example, in "VERITAS Data Availability Solution".

FIG. 2 shows an example of a copy-on-write method to explain how to create a snapshot in the prior art. The method of FIG. 2 is a copy-on-write method of passive copy type in which only when a writing operation is conducted, a copy is produced in a snapshot volume. This is generally conducted in the copy-on-write method.

In the copy-on-write method, a switch 201 changes a read data position as if source data 110 in a source volume 102 as an object of snapshot acquisition is copied as snapshot data 112 into a snapshot volume 103 at a virtual data position. Assume, for example, that a reference host snapshot 105 to refer to snapshot data attempts to read (206) a field of the snapshot data. Since the data copy operation in the snapshot volume has not been completed at this point of time, the read operation is actually conducted using the source volume (207). When a host 104 issues a data write request 203 for the source data 110, execution of the write request is temporarily stopped or inhibited and data associated with the request is saved in the snapshot volume (204). After the data is completely saved, a writing operation of the write request (205) is executed. Thereafter, "1" indicating completion of the copy creation is marked on a copy completion table 202. When the reference host snapshot 105 attempts to read data from the field (208) for which the copy is completed, data is read from the snapshot volume (209).

Thanks to the operation, even if the original file has been updated, the data at the point of issuance of the snapshot command or instruction can be obtained by accessing the snapshot volume. However, since the writing operation is temporarily inhibited, the writing operation of the host is delayed.

SUMMARY OF THE INVENTION

To update snapshot target data in the snapshot operation of copy-on-write method of the prior art, it is required to first save the data in a storage disposed for the snapshot operation to thereafter update the target data. In this situation, particularly, when a data transfer rate or speed from the source volume to the snapshot volume is low, a long period of time is required to save the data. This causes delay to write data in the source data in the source volume.

In the conventional method of acquiring snapshot data in the data block unit, when snapshot is acquired in the file unit, it is necessary to keep a correspondence for a plurality of blocks. Ordinarily, data of a file is distributed in a volume. Therefore, for a server or a switch to acquire snapshot data in the block unit without paying attention to the file system, it is required to obtain snapshot data of data at each of the file data positions distributed to the volume. Therefore, to acquire a snapshot in the file unit using the snapshot acquiring method in the block unit, it is required to reserve a memory area to keep the correspondence for the blocks. It is also necessary to acquire snapshot data of each data distributively stored in the associated volume.

It is therefore an object of the present invention to acquire a snapshot without delay in an update operation of source data due to an operation to save data.

A second object of the present invention is to simplify, in an operation to create snapshot data in the file unit, a correspondence between data on a source side and data on a snapshot side to thereby reduce the memory usage.

To achieve the object according to the present invention, there is provided a snapshot acquiring method using a storage switch. In the switch, the function to conduct the snapshot operation is integrally arranged as hardware and software to achieve operation in cooperation with software of an external management server. In the operation, to prevent delay in the source data update due to the data saving operation, a mirror of a snapshot target file is created to be kept in any situation or at timing synchronized with a predetermined condition in a source volume or in another volume capable of producing a copy of data at a high speed. That is, according to the present invention, a mirror of source data as an object of a snapshot operation is beforehand created in the source volume. The mirror data in the volume is synchronized with the source data in a continuous fashion or according to a predetermined condition.

Assume that an external management server managing snapshot processing issues a snapshot creation command. After the issuance of the command, the synchronizing operation of the mirror data in the source volume is stopped or interrupted until data associated the command is completely copied onto the snapshot volume. In response to the snapshot creation command, the copy operation is started to copy the mirror data from the source volume onto the snapshot volume. When a host issues a write request for source data as a snapshot object in the source volume, even if an associated copy operation onto the snapshot volume is not completed, data can be written in the source data in the source volume without delay since the source data at the issuance of the snapshot creation command remains as a mirror file. In this way, data consistency is retained on the source volume side.

On the other hand, when a readout request to read data from the snapshot volume is issued on the snapshot side and if mirror data is copied onto the snapshot volume, copy data can be read from the snapshot volume without delay. If mirror data has not been copied onto the snapshot volume, the switch changes the destination of the read request from the snapshot volume to the source volume to read mirror data therefrom. The system conducts operation as if the data exists on the snapshot volume side. The readout data is written also in the snapshot volume. After the mirror files are completely copied onto the snapshot volume, the system resumes the operation to synchronize the source data with the mirror data.

In general, even when a file includes data stored in distributed areas, a snapshot thereof can be created by acquiring data blocks having stored data of the file and acquiring each area managing the file. A data block is not a file management area in a file system but a fixed-length data area to store data of a file. A correspondence between data positions of a mirror file in the source volume and those of a snapshot file in the snapshot volume is required to be kept in a copy correspondence table of the switch.

According to the present invention, when a mirror of a source file is created, a mirror file created in the source volume is configured in successive or sequential data blocks. Therefore, copy correspondence table keeps a simple correspondence between a data block start position on the mirror file side and that on the snapshot file side. And copy correspondence table keeps a correspondence between a position of file management area data on the source side and that on the snapshot side is kept in the copy correspondence table. According to the present invention, the correspondence table stores a data start position and a data length for each data block in the source volume and the snapshot volume. This consequently simplifies the correspondence between the source volume and the snapshot volume. As a result, the memory usage is reduced in the switch.

As above, according to the present invention, the delay in the file update operation by the host due to acquisition of the snapshot is prevented.

According to the present invention, the memory usage of a copy correspondence table to keep a correspondence between data positions of a copy source and those of a copy destination can be reduced.

BRIEF DESCRIPTION OF THE DRAWINGS

FIGS. 12A-12B are flow diagrams showing an example of processing executed by a switch and an external management server to create a snapshot according to the present invention;

FIGS. 13A-13B are flow diagrams showing an example of processing for a switch and an external management server to create a snapshot according to the present invention;

FIGS. 14A-14B are flow diagrams showing an example of processing for a switch and an external management server to create a snapshot according to the present invention.

DESCRIPTION OF THE EMBODIMENTS

Figure 1:
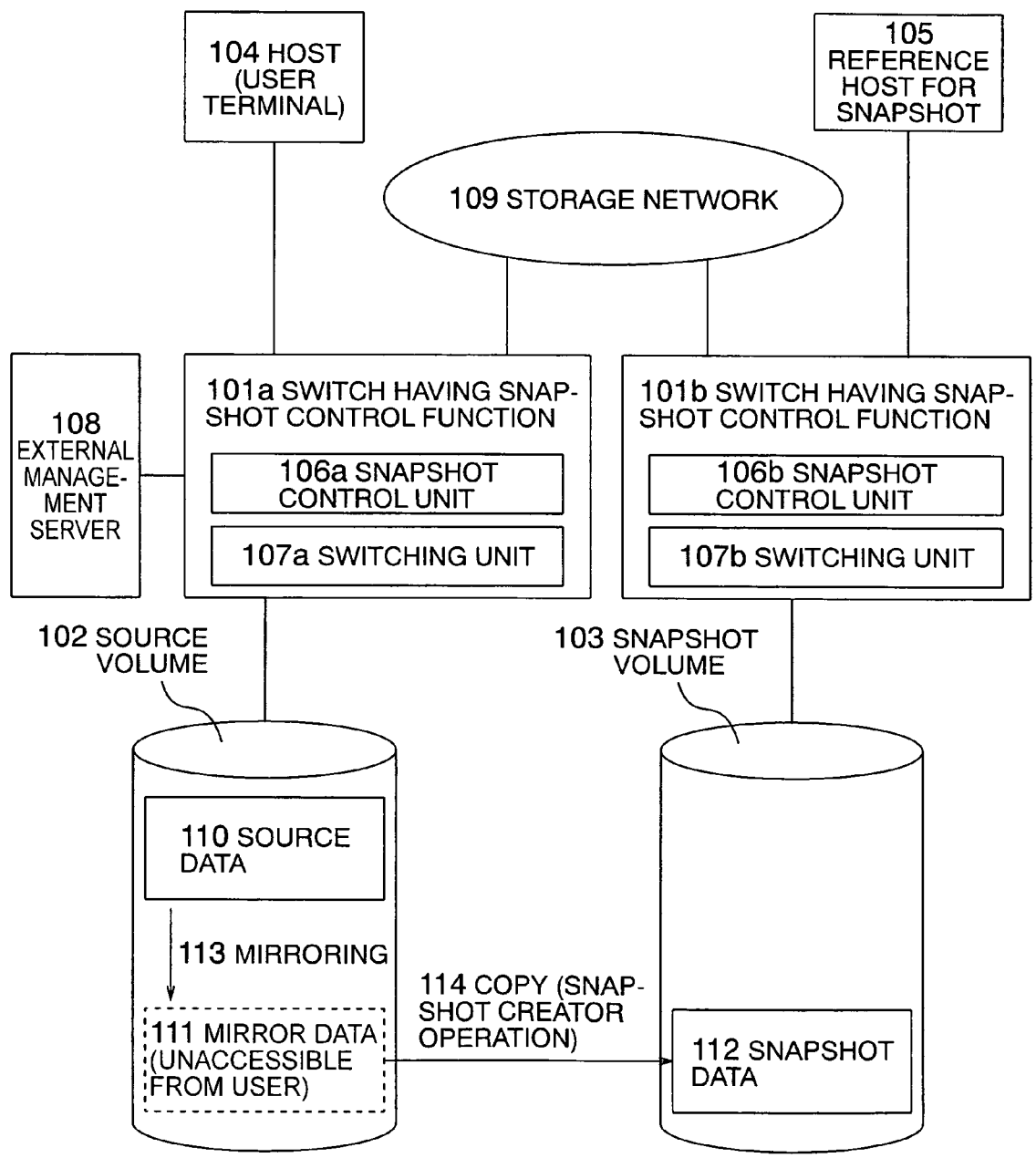
FIG. 1 is a diagram showing a system configuration to conduct a snapshot operation and a data layout to create a snapshot according to the present invention.

Description will now be given of an embodiment according to the present invention by referring to the drawings. FIG. 1 shows a system configuration of the embodiment. The system includes a storage (source volume) 102 having stored user files, a storage (snapshot volume) 103 to keep snapshot data, a host computer 104 to conduct operations in response to requests from the user, for example, to read a user file, to write a user file, and to modify a user file; an external management server 108 to activate application-specific software to conduct file operations, for example, to designate a snapshot file and to conduct a file mirroring operation in the source volume 102, a switch 101a having functions to acquire a snapshot, a switch 101b which is connected via a storage network 109 to the switch 101a and which is functionally similar to the switch 101a, and a reference host for snapshot 105 connected to the switch 101b to refer to snapshot data.

The external management server 108 includes software to operate a file system and conducts operations associated with file access processing, for example, to control a snapshot acquisition target or objective file for which a snapshot is to be acquired.

The constituent components are connected to the switch 101a or 101b having the snapshot control function. As an interface for the connection, there may be used Fibre Channel Interface, Small Computer System Interface (SCSI), or Ethernet using internet protocol (IP) interface.

The switch 101a includes a switching unit 107a and a snapshot control unit 106a. The unit 106a has a snapshot control function to control acquisition of a snapshot by changing operation of the switch according to a storage position of data for a data reading or writing operation. Similarly, the switch 101b includes a switching unit 107b and a snapshot control unit 106b. Each of the switching units 107a and 107b is a module to conduct operation as an ordinary storage switch to change connection by an interface. The source volume 102 includes the source data 110 as a target or object of the snapshot acquisition. According to the present invention, the external management server 108 conducts a mirroring operation 113 for the source data 110 to create mirror data 111 in an area unaccessible from the user. The switch 101*a* carries out a copying operation 114 for the mirror data 111 to create a copy of the snapshot target data, i.e., snapshot data 112 in the snapshot volume 103.

In general, the snapshot server to acquire a snapshot conducts the snapshot control operation in the prior art. However, the control operation can also be conducted in a storage or a storage switch. By embedding the snapshot control function in the switch, a snapshot can be efficiently acquired regardless of the type of the server. Therefore, the switch includes the snapshot control function in the embodiment.

Figure 3:
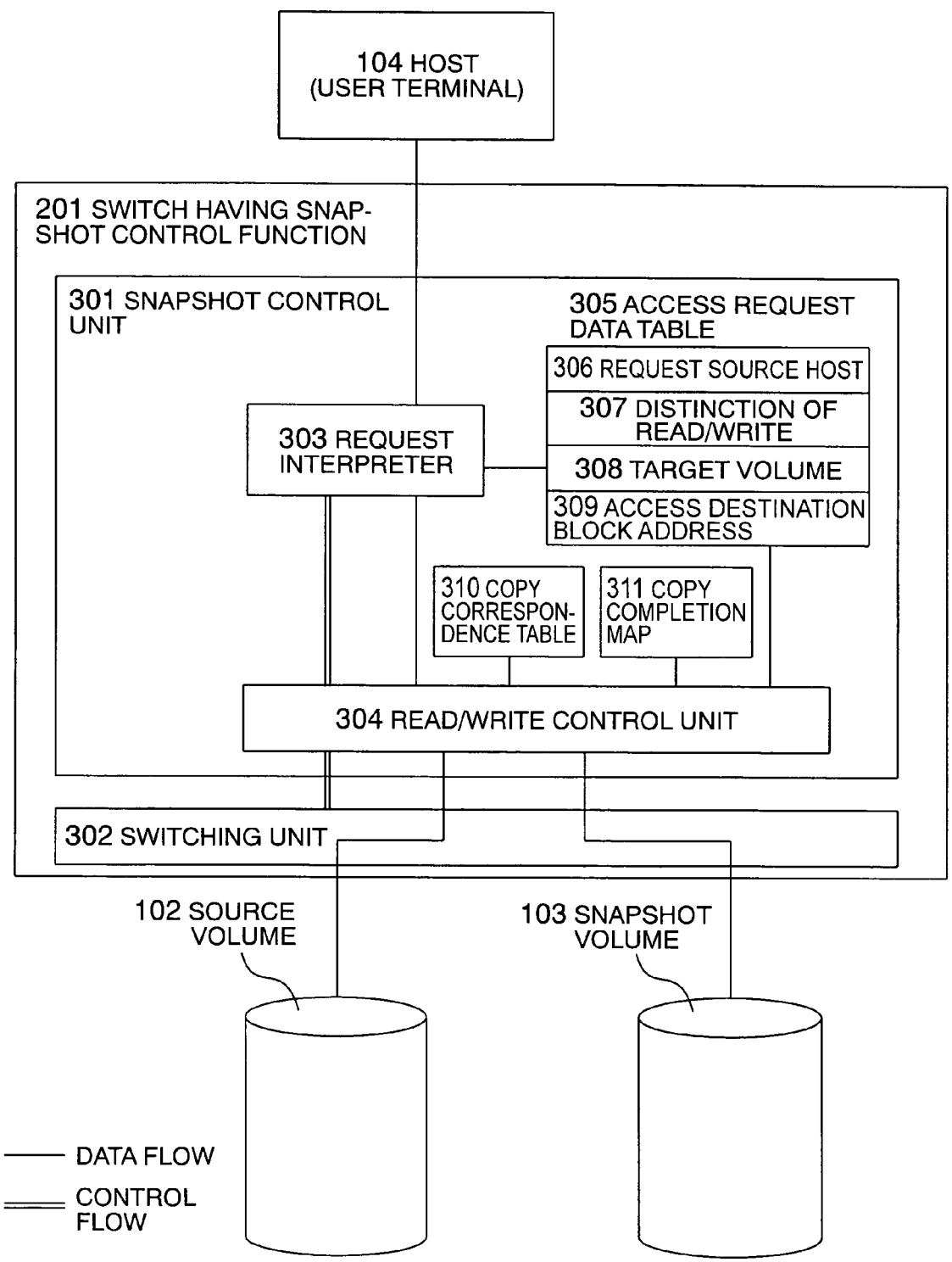
FIG. 3 is a diagram showing an outline of an internal configuration of a switch having a snapshot control function.

Next, description will be given of a basic operation of the embodiment. FIG. 3 shows a configuration of a switch having the snapshot control function. The switch 201 includes a snapshot control unit 301 and a switching unit 302. The unit 301 includes a request interpreter unit 303. The unit 303 interprets a request from the host 104 and keeps in an access request data table 305 an information item of a request source host and information items of a read/write type 307, a target volume 308, and an access destination block address 309. The snapshot control unit 301 also includes a copy correspondence table 310 to keep a correspondence between a storage position of the source data as a target (source) of the snapshot set by the user and a storage position of snapshot data to be created and a copy completion map 311 to record information indicating whether or not data to be referred to has already been copied from the source volume 102 into the snapshot volume 103.

The snapshot control unit 301 includes a read/write controller 304. The controller 304 controls the switching unit 302 using the access request data table 305, the copy correspondence table 310, and the copy completion map 311 to set a data position to be actually accessed in the operation to an appropriate position in the source volume 102 or the snapshot volume 103. The snapshot control unit 301 includes software to conduct control and hardware to execute the software. When the snapshot control operation is conducted by another host computer, the load imposed on the host computer and the network is increased. This bottleneck can be removed when software on the switch conducts the snapshot control in place of the host computer to thereby reduce the load imposed on the host computer and the network.

Figure 4:
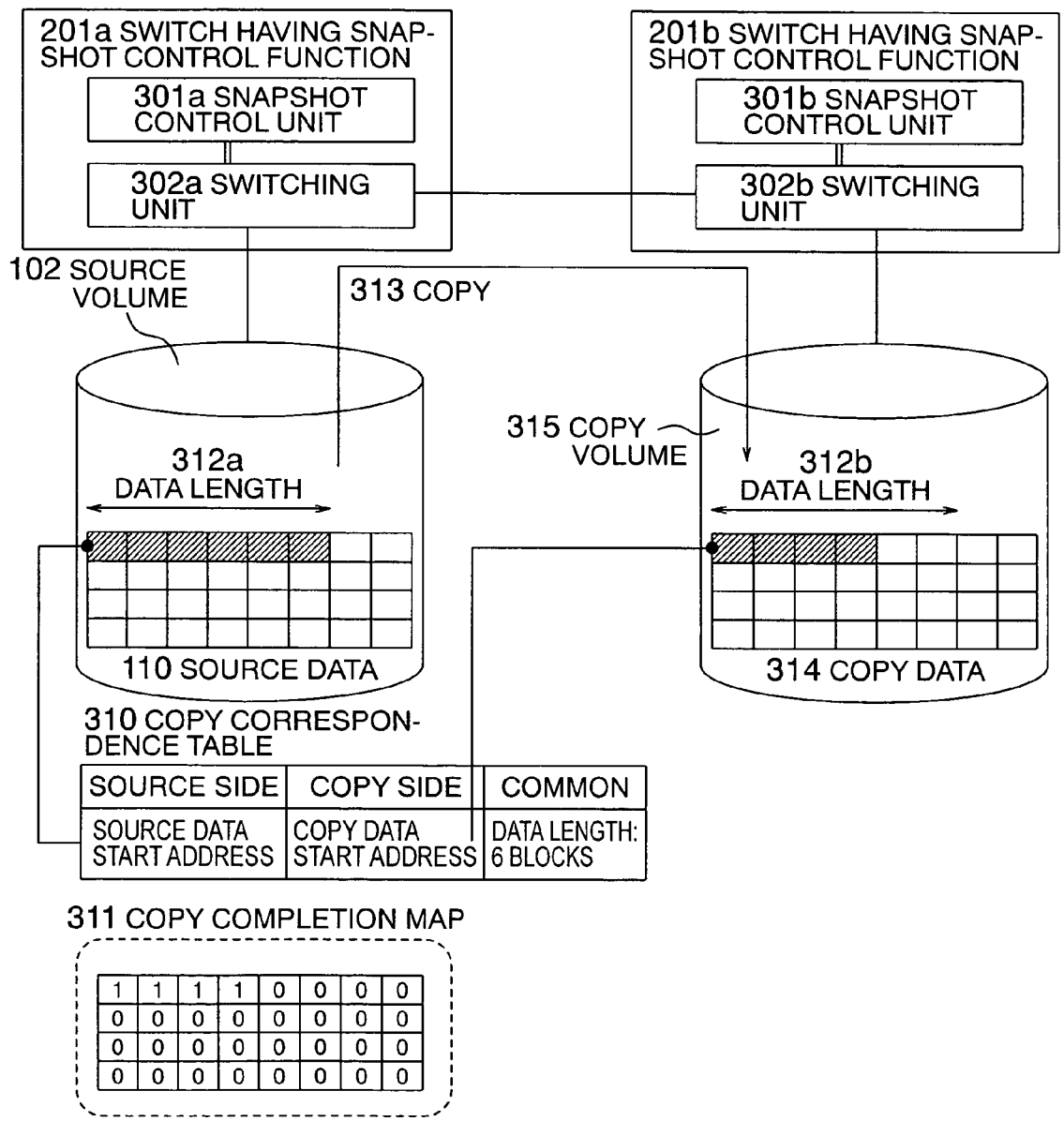
FIG. 4 is a diagram showing an outline of copy creation by a switch having a snapshot control function.

FIG. 4 shows an example of a basic operation for the switch to copy data into a volume at a remote position. As shown in FIG. 3, a switch 201*a* on the source side includes a snapshot controller 301*a* and a switching unit 302*a*. On the remote snapshot side, a switch 201*b* similarly includes a snapshot controller 301*b* and a switching unit 302*b*. The local and remote switches can be implemented using almost the same hardware and software.

Assume that source data 110 in a source volume 102 is copied as copy data 314 into a copy volume 315. By indicating to the switch a start address of source data, a copy data start address on the copy volume side, and a data length, it is possible to produce a copy of data in the block unit. The information items indicated to the switch are kept in the copy correspondence table 310. The switch 102*a* sequentially copies the source data 110 (313). For a data block completely copied, "1" indicating "completion of copy" is marked on the copy completion map 311. The copying operation is finished when data of a data length 312 is copied. Even when data is distributively stored in separate areas, the copy can be similarly created by increasing the number of entries in the copy correspondence table 310 to keep the correspondence for the areas. In such a copying operation, each of the snapshot controller 301*a* on the source side and the snapshot controller 301*b* on the remote side keeps the copy correspondence table 310 and the copy completion map 311. It is required in any situation for the source side to synchronize the data update processing with that on the copy volume side.

Figure 2:
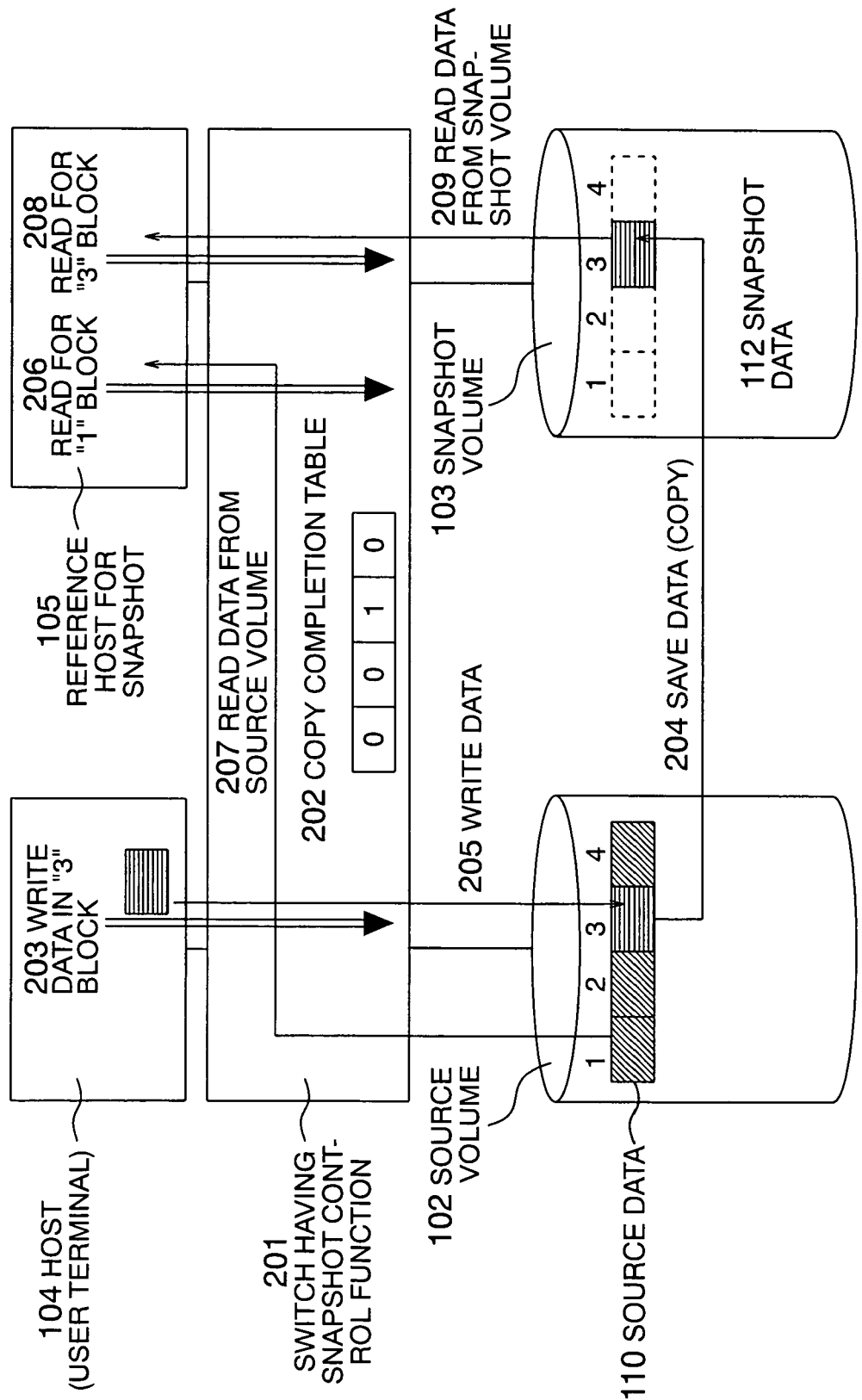
FIG. 2 is a diagram to explain an outline of snapshot acquiring processing in the copy-on-write method by a switch.
Figure 15:
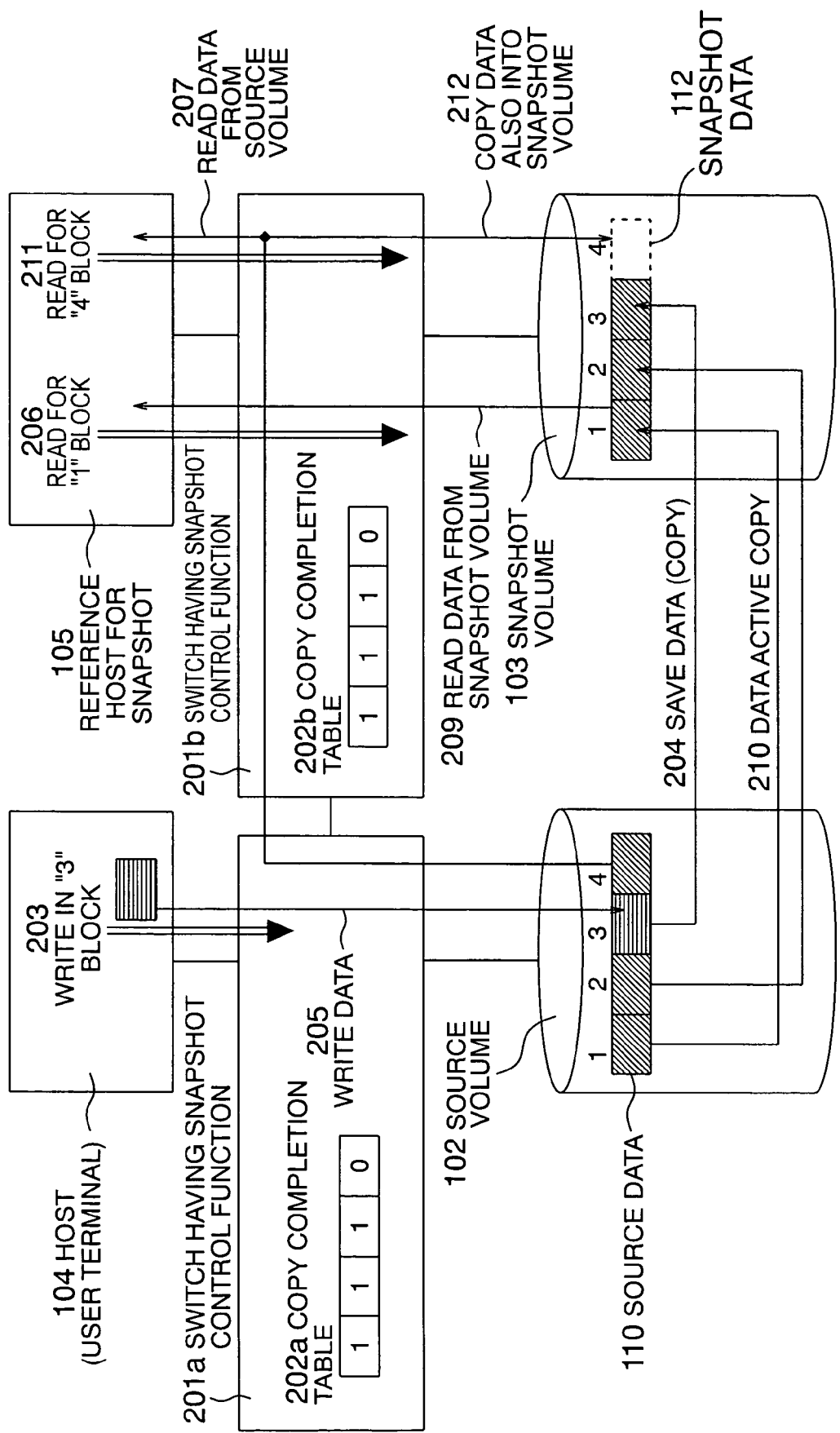
FIG. 15 is a diagram showing an outline of an internal configuration of a switch having a snapshot control function.

FIG. 15 shows a copy-on-write operation of active copy type to copy the overall target data. When the snapshot is created as a complete copy, not a partial copy, it is possible to use the snapshot as a backup of the entire data. When a snapshot volume 212 is at a remote position, a switch on the source side (201*a*) and a switch on the snapshot side (201*b*) are connected via a leased line or a network to each other. In this situation, a copy completion table disposed on the source side and a copy completion table disposed on the snapshot are required to be synchronized with each other. In the copy-on-write operation of passive copy type shown in FIG. 2, data is not copied into the snapshot side unless a writing operation takes place on the source side. However, in a copy-on-write operation of active copy type, data is successively copied (210) on the snapshot side even if a writing operation does not take place on the source side. In this operation, when a reading operation 211 is requested for data not completely copied, target data is read (207) from the source volume and the data is also copied (212) into the snapshot volume.

Figure 5:
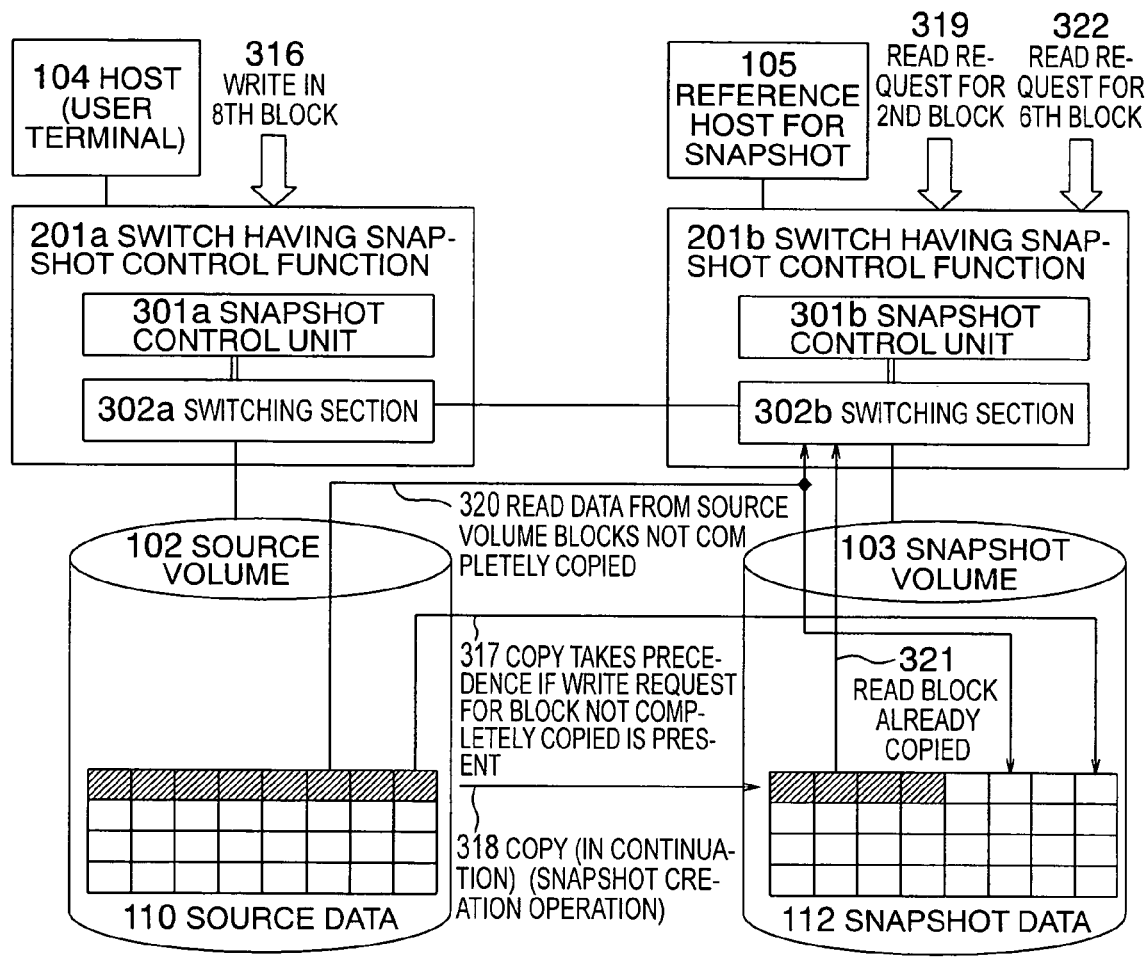
FIG. 5 is a diagram showing an outline of an operation to create a snapshot in the copy-on-write method by a switch having a snapshot control function.

FIG. 5 shows an example of a basic operation for a switch to achieve a copy-on-write operation of active copy type. The switch 201*a* on the source side includes, like the switch shown in FIG. 3, a snapshot controller 301*a* and a switching unit 302*a*. Similarly, a switch 201*b* on the remote site includes a snapshot controller 301*b* and a switching unit 302*b*. Assume in this configuration that a snapshot of source data 110 stored in the source volume 102 is created in the snapshot volume 103 to finally create snapshot data 112 as a copy of the source data.

As in the copying operation by a switch shown in FIG. 4, the switch sequentially copies data while keeping a copy correspondence table 310 and a copy completion map 311 (318). The copy completion map 311 records a block position of a copied block. The map 311 is kept by the switches 201*a* and 201*b*. The operation up to this point is substantially the same as the copying operation. However, when the reference host for snapshot 105 issues a read request, the snapshot controller 301*b* makes the switching unit 302*b* to change the reading position according to the value recorded in the copy completion map 311.

For example, when it is requested to read a second block in FIG. 5 (319), since the copy completion map 311 indicates that the block is already completely copied, the data read operation is immediately conducted. When it is requested to read a sixth block (322), since the copy completion map 311 indicates that the block is not copied yet, the data read operation is conducted using the source volume (320). When the host 104 issues a writing request 316 for the eighth block of the source data 110, since the copy completion map 311 indicates that the block is not copied yet, the writing operation is temporarily stopped in the copy-one-write method of this type, and the copying operation on the snapshot side takes priority (317). That is, data is first saved and then the writing operation is carried out in the block of the source data 110. The switch can achieve the copy-on-write function by using the copy correspondence table 310 and the copy completion map 311 in this way.

Figure 6:
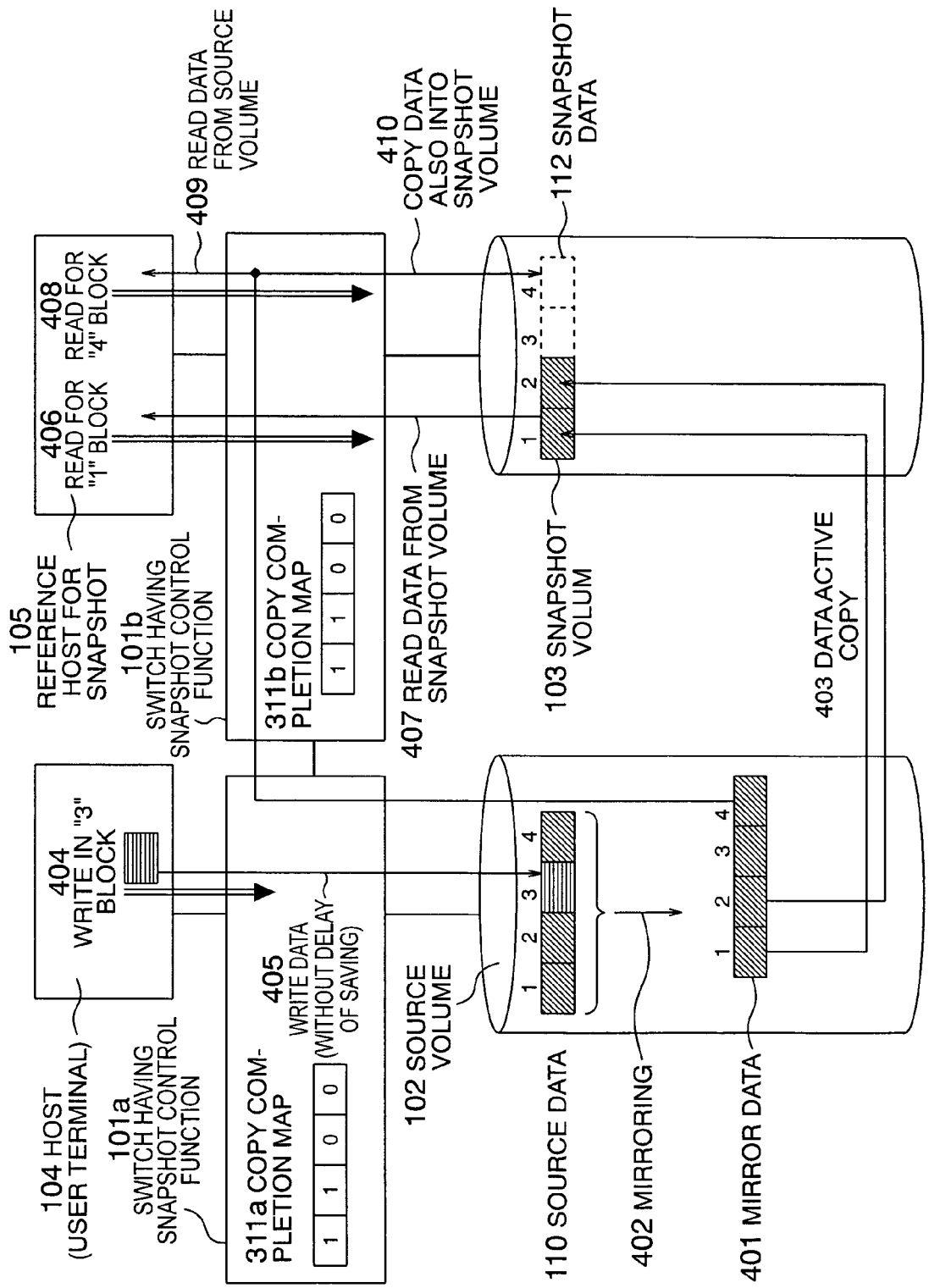
FIG. 6 is a diagram to explain an example of copy-on-write processing to create a snapshot by a switch according to the present invention.

Next, description will be given of an outline of an operation flow according to the present invention. FIG. 6 shows an example of processing to acquire snapshot data when the snapshot target is a block. For this operation, the system configuration is basically the same as that of FIG. 5 using the switch to conduct the copy-on-write operation. However, the processing is different from that described above, for example, in that a mirroring operation 402 is conducted in the source volume 102.

Assume now that the source volume 102 contains user data and the user has registered the data as a target of the snapshot operation. The data is called source data. Once source data 110 is designated, the external management server 108 mirrors (402) the source data in the source volume 102 containing the source data to resultantly create mirror data 401 therein. In this way, the mirror data is kept in the storage in any situation or is kept therein by synchronizing the data with the source data according to a predetermined condition. Therefore, even when the host 104 issues a request, for example, a request (404) to write data in the third block, the data can be written in the third block without saving the data (405).

On the other hand, when a snapshot creation command is issued, the mirror data synchronizing operation is temporarily stopped. In the embodiment, the switch 101a mirrors data 401 into the snapshot volume 103 in sequence (403). The block thus copied is recorded in the copy completion map 311a. Thereafter, the map 311a successively synchronizes to the copy completion map 311b of the switch 101b on the snapshot side. When the reference host for snapshot 105 issues a request, for example, a request (406) to read the first block in FIG. 6, since the copy completion map 311b indicates that the block is already completely copied, data is read from the snapshot volume (407). When the reference host for snapshot 105 issues a request to read the fourth block, since the map 311b indicates that the block is not completely copied yet, the switch 101b reads (409) data from the mirror data 401 in the source volume 102 and copies the data into the snapshot volume at the same time (410).

According to the present invention, the snapshot operation can be conducted not only in the block unit as above but also in the file unit. Description will next be given of a method of mirroring a file and data used in the mirroring operation employed as a pre-stage to create a snapshot of a file.

It is required that a volume in which mirror data is created is a source volume or a volume other than the source volume to which data can be transferred from the source volume at a high data transfer rate. In the embodiment, the volume in which mirror data is created is a volume physically same as the source volume 102. However, logically, the volume is a mirror volume (logical volume 2) 501 stored in a partition other than a partition of the source volume. The mirror volume is configured not to be directly viewed from the host 104. The logical volume 1 (510) stores the source file.

On the other hand, the external management server 108 operating in cooperation with the switch 101 has a function to control a file system. The server 108 keeps a list of files designated by the user as targets of snapshot. The server 108 keeps in a mirror correspondence table 502 a correspondence between a block address of a source file in the source volume and a block position of a mirror file corresponding to the source file. Therefore, the external management server 108 can create a mirror file at an appropriate position in the mirror volume 501.

According to information of the mirror correspondence table 502, the external management server 108 creates a mirror target map 504 in the switch 101. The map 504 indicates a position of a block containing data of the snapshot target file. The map 504 includes a bit storage area for each block and "1" is set to a bit storage area corresponding to a block contained in a snapshot target file. Thanks to the mirror target map 504, the switch 101 can detect a writing operation in the source file.

The external management server 108 creates a file control information map 506 in the switch. The map 506 indicates whether or not the pertinent block contains data including positional information of data of the pertinent file in the file system. The file control information map 506 includes a bit storage area for each block and "1" is set to a bit storage area corresponding to a block containing positional information of data of the file. When the positional information of data of the file is updated, it is required that the switch 101 notifies the positional information of the updated block to the external management server 108. The server 108 then updates the mirror correspondence table 502 to create a mirror of new data as a mirroring target.

When a data block is updated in the source file and a mirror synchronizing operation is required, "0" which means mirror update required is registered to the mirror completion map 505. When the mirroring is completely conducted by the external control serve 108, the completion of mirroring is recorded in the mirror completion map 505. The map 505 includes a bit storage area for each block and "1" is set to the bit storage area corresponding to the block for which the mirroring is completely conducted.

The mirror target map 504, the mirror completion map 505, and the file control information map 506 are collectively called a mirror bit map 503. The map 503 is used on the source side switch (101) side to control the mirroring in the source volume 102 in the block unit. The mirror bit map 503 manages a file data block 508 storing information of a file data and a file control block 507 storing file control information of the file system as an independent data respectively.

Figure 8:
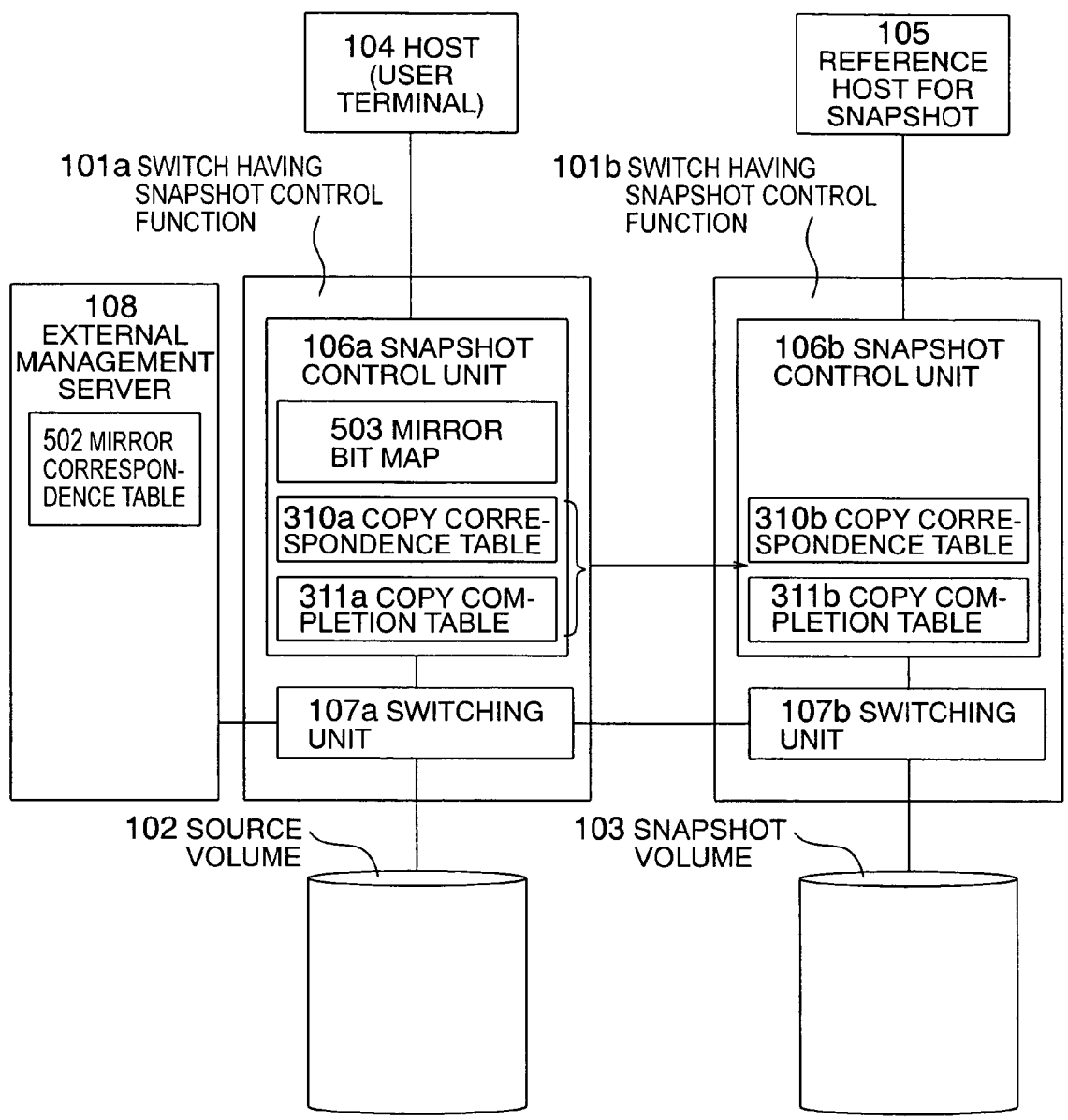
FIG. 8 is a diagram showing an example of data items kept in respective devices for a switch to create a snap shot in a remote place according to the present invention.

FIG. 8 shows an example of data kept in the external management server 108 and the switch 101 according to the present invention. The server 108 keeps a mirror correspondence table 502. The switch 101a connected to the host 104 and the source volume 102 includes a snapshot controller 106a and a switching unit 107a and keeps in the controller 106a a mirror bit map 503, a copy correspondence table 310a, and a copy completion map 311a. The switch 101b connected to a reference host for snapshot 105 and a snapshot volume 103 similarly includes a snapshot controller 106b and a switching unit 107b. However, the switch 101b keeps only data of a copy correspondence table 310b and a copy completion map 311b. The data items respectively of the copy correspondence table 310a and the copy completion map 311a are respectively copied into the copy correspondence table 310b and the copy completion map 311b (509) on the source side. The data items are synchronized with those on the source side in any situation.

Figure 9:
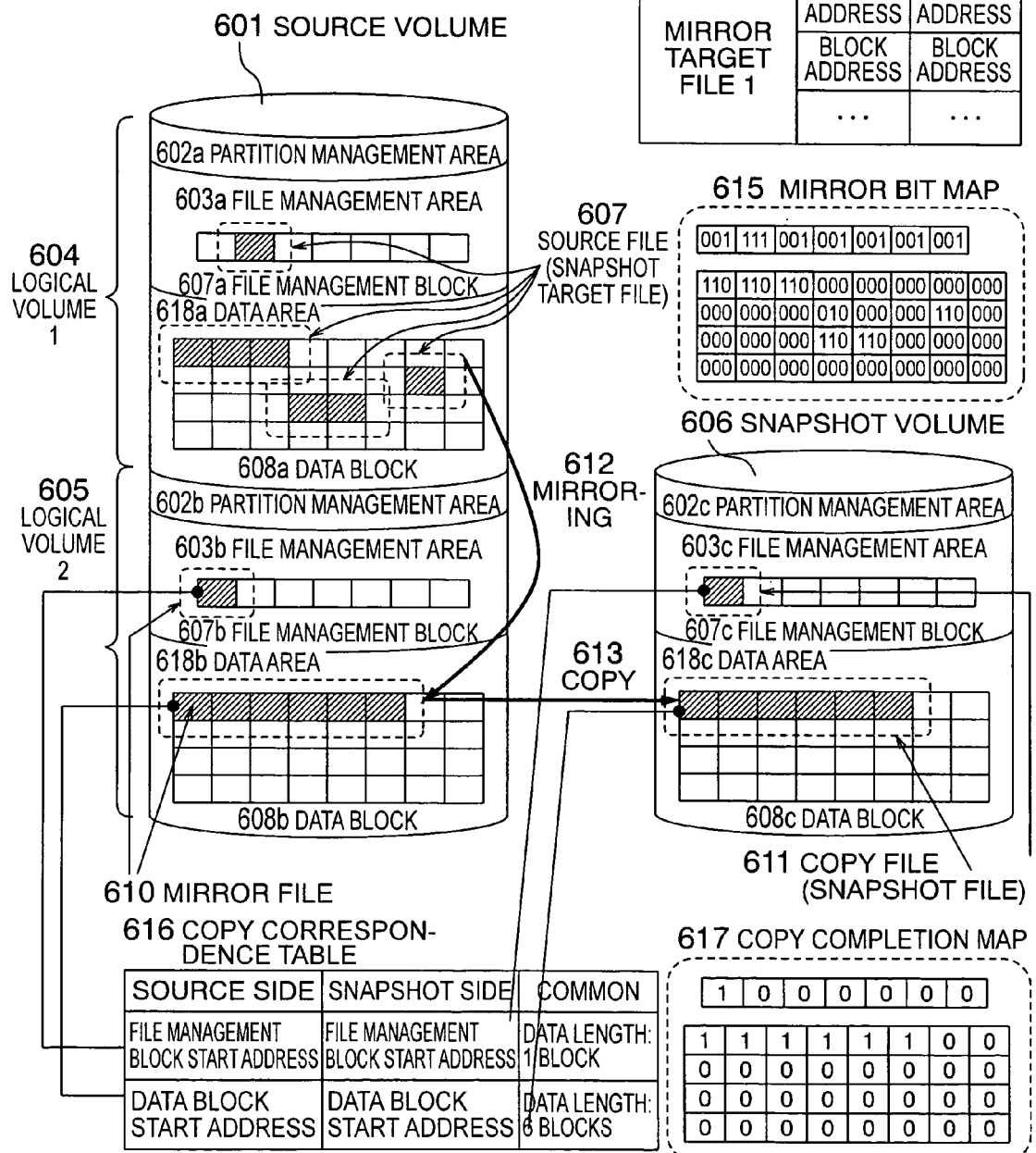
FIG. 9 is a diagram showing an example of data layouts in volumes to create a snapshot in the file unit according to the present invention.

Next, description will be given of an outline of data layouts in an embodiment to create a snapshot of a file according to the present invention. A source volume file 601 is divided into a logical volume 1 (604) and a logical volume 2 (605) as shown in FIG. 9. The logical volume 1 (604) includes a file 607. The file 607 includes data stored in a file management area 603a and a data area 618a. The file management area 603 includes a file control block 607a as a minimum data unit. Similarly, the data area 618 includes a data block 608 as a minimum data unit.

Figure 7:
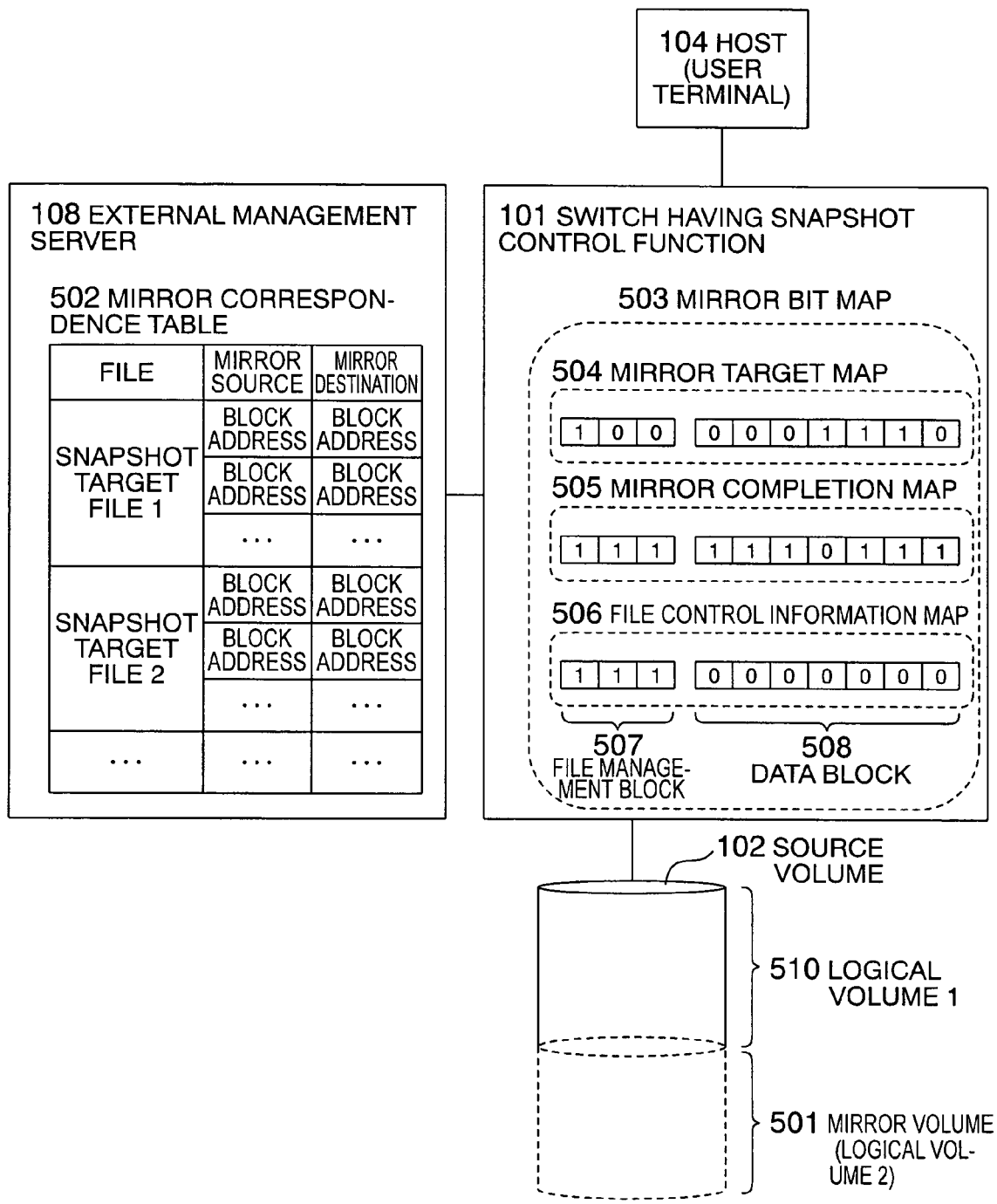
FIG. 7 is a diagram showing layouts of data items required for a switch and an external management server to conduct a mirroring operation in the file unit.

When the source file is designated as a snapshot acquisition target file, the external management server 108 mirrors (612) the source file 607 in the logical volume 2 (605) to create a mirror file 610. To conduct the mirroring, data is stored in successive areas as the mirror file 610 shown in FIG. 9. In the operation, a mirror correspondence table 614 and a mirror bit map 615 are used as described in FIG. 7.

In FIG. 9, each block of the mirror bit map 615 includes bits of a mirror target map 504, a mirror completion map 505, and a file control information map 506. In FIG. 9, data of a file is distributively stored in data blocks 1, 2, 3, 15, 20, and 21 of the data area 618a. The external management server conducts the mirroring operation. To determine whether or not the mirroring is to be conducted, the switch detects a data storage position of data written in a storage area by a host via the switch. Therefore, the switch can mark an associated indication on the mirror bit map 615. The external management server conducts a mirror synchronizing operation in a realtime fashion or according to a predetermined condition.

Assume that the external management server 108 issues a snapshot acquisition command. In response to the command, the switch creates a snapshot, i.e., a copy file 611 in a snapshot volume 606. In the embodiment, since the snapshot is conducted through a copy-on-write operation of active copy type, the mirror file 610 is copied into the snapshot volume 606 according to the copy correspondence table 616 (613). The block completely copied is recorded in the copy completion map 617.

Since the switch includes the copy-on-write function, when an attempt is made to read uncopied data from the snapshot volume 606, the switch controls the operation to read objective data from the mirror file 610 on the source volume side. The obtained data is recorded in the snapshot volume 606 and the condition of "copied data" is registered to the copy completion map 617. In each of the mirror correspondence table 614, the mirror bit map 615, the copy correspondence table 616, and the copy completion map 617, a file management block and a data block are separately treated. Since the file management block is also transferred to the snapshot volume, the snapshot volume becomes a volume to which the reference host for snapshot can referred. Each logical volume has a partition control area 602a. However, the mirroring and the copying are not conducted for the information of the partition management area 602a.

Description will now be given of improvement of efficiency of the snapshot acquisition using a plurality of files. In this case, user application programs executed by the host computer access a plurality of files. Description will now be given of improvement of efficiency of the snapshot acquisition using the files.

Figure 10:
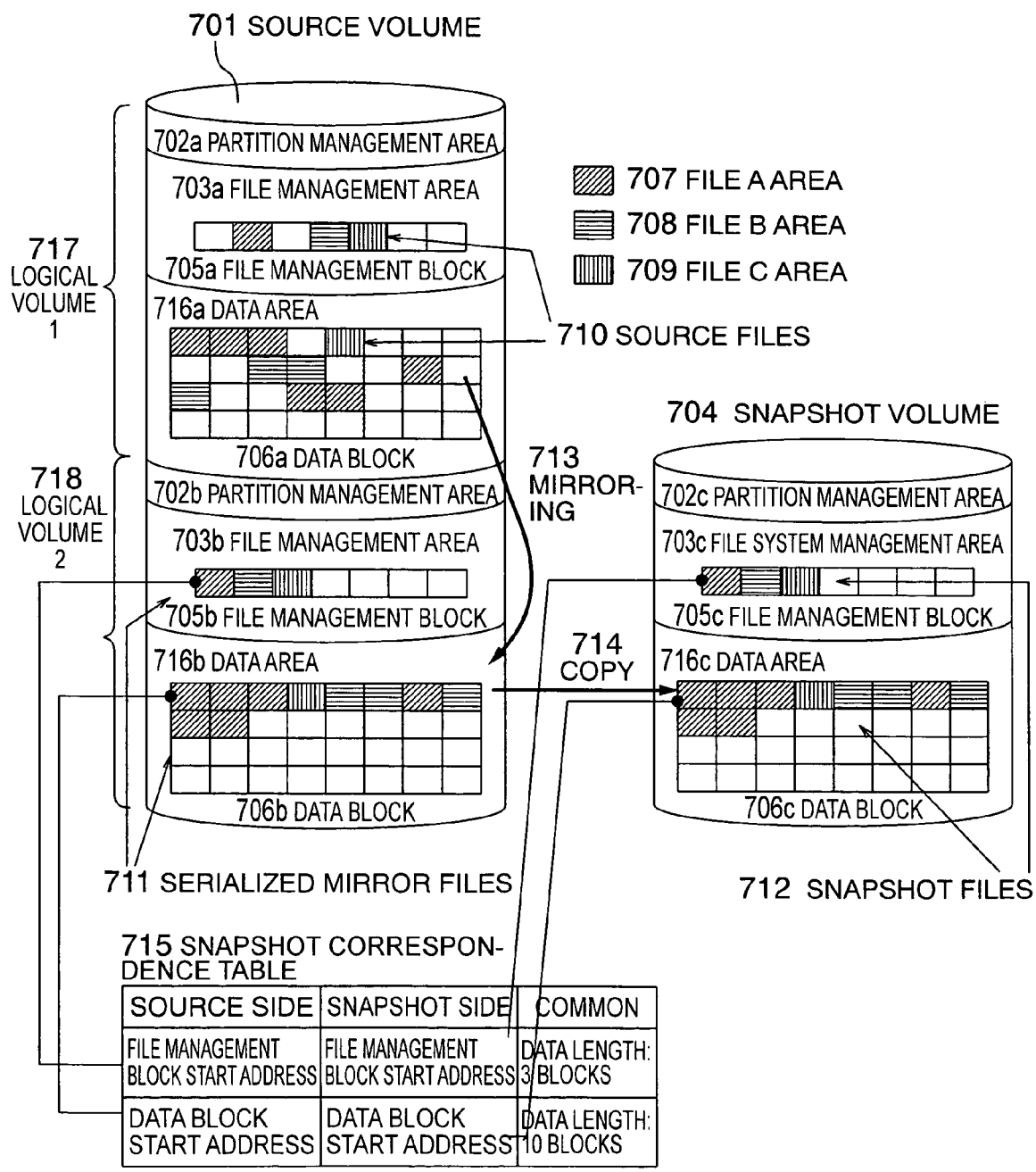
FIG. 10 is a diagram showing an example of data layouts in volumes to create snapshot data of a plurality of files according to the present invention.

Assume that snapshot data is created for file A (707), file B (708), and file C (709) contained in a logical volume 1 (717) of a source volume 701 as shown in FIG. 10. Each of these source files 710 is generally distributed as a file control block and a data block 706. Mirrors of these files are created in a logical volume 2 (718). In operation of the mirroring 713, the mirrors of the source files 710 are arranged (optimized) to be stored in successive or sequential storage areas to obtain a mirror file 711 containing successive data items as shown in FIG. 10.

Mirror data is created in a file management area 703b and a data area 716b. To create snapshot data, a correspondence for data items at two positions is recorded in the snapshot correspondence table 715. As a result, snapshot control is simplified and the memory usage in the switch is reduced. In the creation of snapshot data, data of mirror files sequentially arranged as above is copied (714) into the snapshot volume 704 to create a plurality of snapshot files 712 similar to the operation shown in FIG. 9. Also when a plurality files are used as in this case, there exists a partition management area 702. However, the mirroring and the copying are not conducted for the information of the partition control area 702.

In some cases, after mirror files are created for files A, B, and C, one of the files, for example, file A is changed in its size and a gap appears between data blocks, and hence flagmentation takes place. Also when the designation of snapshot target files is partly obsoleted or cancelled, data items become not successive in data blocks. In such a case, a control server connected to the switch optimizes allocation of the copied data items of the files. That is, when data blocks are separated from each other due to a change in data blocks, the control server changes the recording position of data items to remove gaps between the data blocks while retaining file consistency. For this purpose, it is required to reserve an appropriately large free area in the source volume. Positions of data items of the files resultant from the update are registered to the mirror correspondence table 614. It is required that the software in the external management server includes a function to detect file allocation information of the file system to control the data storage positions in the volume. Through these operations, the data items thus mirrored are stored in sequential storage areas.

The processing of the present invention can be summarized as below. Before snapshot data is acquired, the mirror files 711 of the source files 710 as snapshot acquisition targets are created in successive areas of the source volume 701. When a source file is updated, the contents of the associated mirror file is synchronized with those of the source file. When the external management server issues a snapshot command according to a request from the user, the mirror synchronizing operation is stopped and the switch conducts acquisition of snapshot data in the block unit.

In the operation, data of each mirror file is copied (714) into the snapshot volume 704. When a data read request is issued for the snapshot volume 704 to read uncopied data, data is read from the mirror in the source volume 701 and the data is copied into the snapshot volume 704. As a result, even if the data transfer has not been completed at issuance of the read request, it is possible to conduct processing as if the snapshot volume includes all data of the source file by reading data from the snapshot volume 704. However, when the data is read from the source volume, there occurs delay in the processing due to the data reading operation.

On the other hand, even if the host computer on the source side desires to write data in the source volume 701, the data writing operation is conducted without delay associated with the snapshot operation. When the data is completely transferred to the snapshot volume 704, the snapshot acquisition is completed. Thereafter, the operation to synchronize the source file with the associated mirror file is resumed for subsequent snapshot acquisition. The snapshot command can be issued independently of or in cooperation with an access request from the user to the file in the source volume 701.

Figure 11:
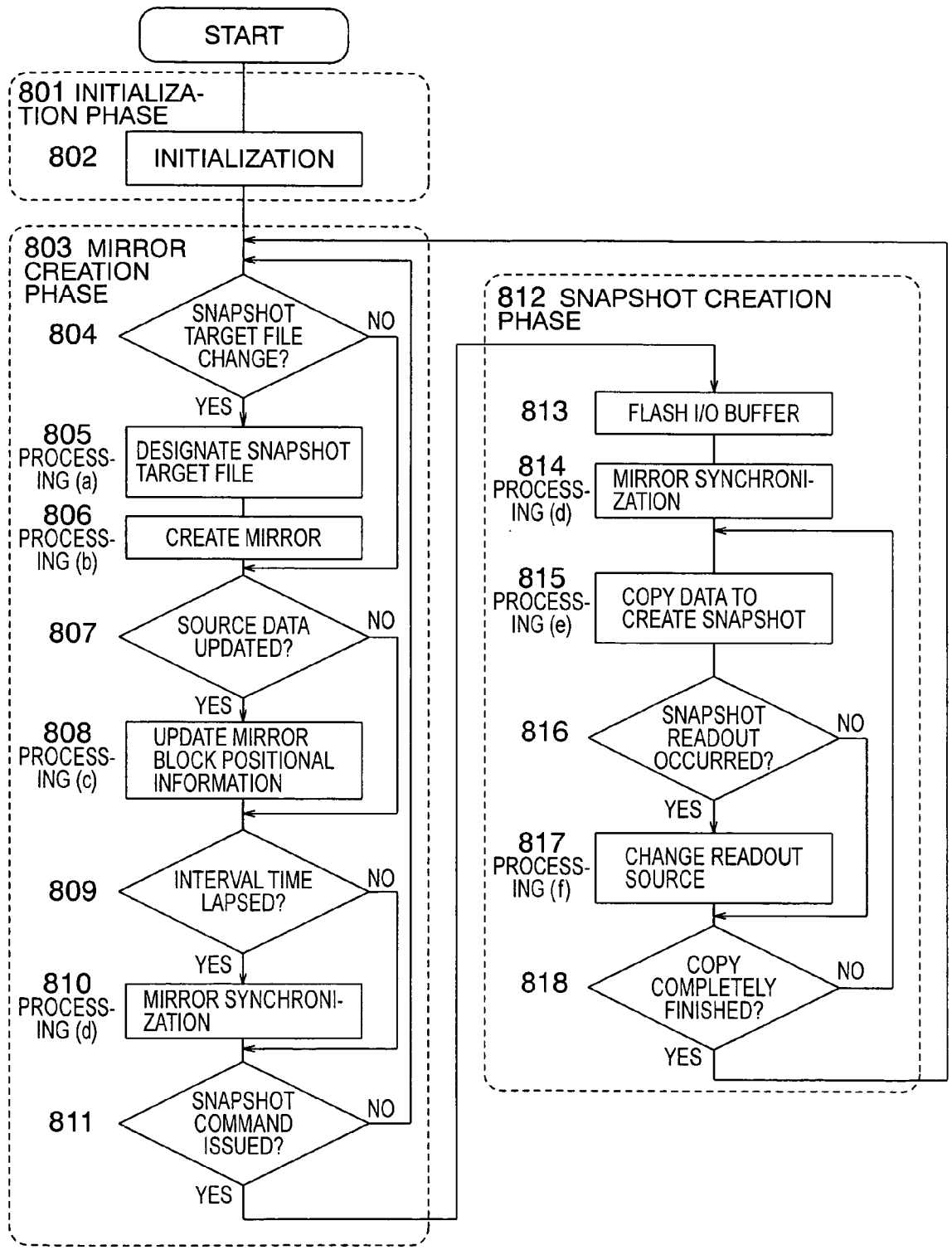
FIG. 11 is a flowchart showing snapshot control according to the present invention.

FIG. 11 shows the sequence of software control steps in a flowchart. The external management server and the switch operate mutually different software to achieve cooperative operation to implement an operation to create snapshot data of a file.

When the software starts its operation, processing is executed (802) in an initialization phase 801 in which, for example, variables, tables, and maps are initialized for programs and a logical volume is reserved for mirror files.

Next, snapshot target files are mirrored in a mirror creation phase 803. Since no snapshot target file has been registered in the initial state, the user indicates registration of such target files. According to the indication, control goes to the yes side in the snapshot target file changing step 804 to execute a snapshot target file designation step 805. In the processing, the external management server first registers a file name to a mirror correspondence table 922 as shown in an operation step 901 in FIG. 12A. In this situation, the external management server reads information such as information of the size of a data block from the file system of a source volume including the source file. The server uses the information as parameters to create, for example, a bit map.

Next, a mirror creation step 806 will be described. In the host, an operating system is driven to entirely flash input/output (I/O) buffers to disks and to temporarily stop any I/O operation. As shown in FIG. 12B, software of the external management server mirrors the file in a particular area of the same source volume as sequential or successive data (902) and then records the storage block positions of the source file and the mirror data in the mirror correspondence table 922 (903). Thereafter, for the file created in the mirror destination, a check is made to determine a block having stored file system information identifying a data position of the file, and "1" is recorded in a file control information map 923 in the switch (904). The information to identify the file data position is generally contained in an associated file management block. The information is contained also in an associated data block depending on cases.

According to information of the mirror correspondence table 922, "1" is recorded in a mirror target map 924 of the switch for the mirror target (source) block (906). Next, "1" indicating completion of the mirroring is recorded in a mirror completion map 925 of the switch (907). Thereafter, the I/O operation of the host beforehand stopped is enabled or resumed. Since the I/O operation is once stopped to first register a mirror target file, the operation on the host side may possibly be affected. However, after this point, unless the mirror target file is not considerably changed, the I/O operation is not stopped for a long period of time which adversely influences operation of the host.

To prepare the system for an event of issuance of a snapshot command, the switch reserves an area in the snapshot volume to create snapshot data therein. The switch then creates a copy correspondence table having recorded a mirror data start position, a snapshot data start position, and common data lengths of the mirror data and the snapshot data, and initializes an associated bit of the copy completion map to "1" (908).

Even when the mirror creation is completed as above, a subsequent I/O request from the user may possibly change data in the source file. As shown in FIG. 13A, according to a mirror target map 927, the switch can detect or determine whether or not data has been changed. When data is written in a block (926) of the source file (909), the switch detects that the source data is changed (807). To update the mirror block positional information, the switch executes processing as below (808).

First, a branch step (910) is conducted to discriminate between a case in which "1" is beforehand set to an associated bit of the mirror target map (927) and a case in which "0" is set thereto. If the bit contains "1", "0" is set to an associated bit of mirror completion map (905). By referring to the file control information map (928), a branch operation (911) is conducted for "1" or "0" of an associated bit. If the bit is "0", no action is taken in step 910. If the bit is "1" in step 911, the block position is notified to the external management server, which in turn updates a mirror correspondence table 929 (912). The external management server conducts a mirroring operation again to create a bit map for an updated part and records "1" in the mirror completion map 930 (913). Depending on cases, the number of mirror target blocks changes. The new mirror target blocks are completely mirrored and hence "1" is recorded. If the bit is "0" in step 911, the switch does not take any action. However, since the mirroring has not been finished for a field of "0" in the mirror completion map 905, the external management server conducts a mirror synchronizing operation as below.

The mirror synchronization may be executed in a realtime fashion at occurrence of the change or, for example, at an interval of a predetermined period of time. In the embodiment, the mirror is synchronized each time a predetermined period of time lapses. As a result of a branch 809, mirror synchronization processing (810) is executed. As shown in FIG. 13B, for a field of "0" in the mirror completion map 931, a mirroring operation is conducted from source file blocks 932 into blocks 933 of the mirror file (914). Then, "1" is recorded in the mirror completion map 934 (915). If the external management server has been issued a snapshot acquisition command, processing is executed to pass control to a snapshot creation phase 812 (811). Otherwise, processing steps 804 to 811 are repeatedly executed.

After the issuance of the command, control goes to the snapshot creation phase 812. An I/O operation from the host is first stopped and then the I/O buffer is flashed (813). Next, mirror synchronization processing 814 similar to the mirror synchronization processing 810 is executed to enable or resume the I/O operation stopped before. This results in a state in which data of the snapshot target file is determined and the mirror file is created.

Subsequently, a copy operation is conducted to create snapshot data (815). In this operation, as can be seen from FIG. 14A, the switch refers to the copy correspondence table 935 to partially copy data of the mirror file from the (uncopied) blocks for which "0" is set to the bit in the copy completion map into the snapshot volume. The switch sets "1" to the bit of the copy completion map for the copied blocks (916). The switch then synchronizes the contents of the copy completion map 936 on the snapshot side with that on the source side. The copy is partially carried out because the processing is sequentially executed in the description of the embodiment. If the copy processing can be interrupted by detecting a writing operation in the snapshot, the data may also be successively copied.

When the reference host for snapshot issues a read request to the snapshot volume, control branches to an associated operation (816). As shown in FIG. 14B, the switch changes the source of the reading operation. The switch first refers to the copy completion map 937 (918). If the map 937 contains "1" indicating "completion of copy", the switch reads data from the block 938 of the snapshot file (919). If the map 937 contains "0" indicating "copy not completed for the target of the read request", the switch reads data from the block 939 of the mirror file (920). The obtained data is temporarily kept in the switch on the snapshot side. The switch also writes the data in the block 940 of the snapshot file to thereby complete the copy of data. The switch changes the bit from "0" to "1" in the copy completion map 941 (921). Until the copy operation of processing 815 is completed (817), the switch repeatedly executes processing 815 to 817. When the copy is completely finished, control returns to the mirror creation phase 803.

All of the processing is successively executed in the example. However, actually, the processing is executed through collaboration of the external management server and the snapshot side. Therefore, processing which can be independently executed can be simultaneously or concurrently executed.

According to the present invention, a source file can be copied into mirror file in one source volume (storage having large storage capacity) at quite a high speed. The present invention is therefore effective when the data transfer rate from the source volume to the snapshot volume is low. According to the method, unlike the conventional method, data of the latest source file is copied onto the mirror file in any situation. Therefore, update data can be overwritten in the source file without awaiting completion of the data copy into the snapshot side. That is, even when the data transfer rate is low between the source volume and the snapshot volume, the operation to write data in the source file is not delayed.

In the description of the embodiment, it is assumed that the system configuration includes two switches as shown in FIG. 1. However, the snapshot acquiring method of the present invention is applicable to a system in which the system configuration is changed, for example, in a system including a source volume, a snapshot volume, a host computer, and a switch arranged between these constituent components and the switch executes the processing shown in FIGS. 12, 13, 14.

The processing can also be executed by storing a program to execute the snapshot acquiring method of the present invention in a computer-readable recording medium. The program is thereafter loaded from the medium into a memory of a process unit of the switch to execute the program.

According to the present invention as described above, by disposing a mirror of a snapshot target file in a source volume, data can be written in the target file without awaiting completion of processing to acquire snapshot data. In the file mirroring operation, data is stored in successive areas. This consequently reduces the memory usage to keep information regarding a correspondence for copy positions associated with the snapshot acquisition.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage switch having a backup acquiring function and being connected to a host computer and a storage device, comprising:

a means which mirrors contents of source data in a source volume as a snapshot target, thereby creating mirror data in the source volume containing the source data; wherein when creating a mirror of a file including data stored in storage areas that are distributed non-sequentially in the source volume, the mirror data are configured of storage areas of sequential data blocks in the source volume;

a means which synchronizes the contents of the source data in the source volume, updated in response to an access request from the host computer, with contents of the mirror data in the source volume;

a means which copies, in response to a snapshot creation command from a management computer, the contents of the mirror data from the source volume into a snapshot volume in parallel with writing of data into the source data in response to a write request thereto; and a means which records information items including a data start position in the source volume of the sequential data blocks of the mirror data to be copied from the source volume into the snapshot volume, a data start position in the snapshot volume as a copy destination for the contents of the mirror data to be copied from the source volume into the snapshot volume, and a data length in the source volume of the sequential data blocks of the mirror data to be copied from the source volume into the snapshot volume in a copy correspondence table, with a correspondence between the data start position in the source volume, the data start position in the snapshot volume, and the data length in the source volume of the sequential data blocks;

wherein said means which copies the contents of the mirror data from the source volume into the snapshot volume in response to the snapshot creation command, refers to the CODV correspondence table to copy the contents of the mirror data beginning at the data start position in the source volume into the snapshot volume at the copy destination beginning at the data start position in the snapshot volume, the mirror data to be copied having the data length in the source volume recorded in the copy correspondence table.

2. The storage switch according to claim 1, further comprising a means which records information in a copy completion map, indicating whether each data block of the mirror data to be copied has been copied already into the snapshot volume, wherein the means which copies the contents of the mirror data from the source volume into the snapshot volume, refers to the copy completion map; skips each data block of the mirror data to be copied which is shown in the copy completion map to have been copied already into the snapshot volume; and copies each data block indicated not to have been copied already into the snapshot volume.

3. A method of acquiring a snapshot in a storage switch having a snapshot acquiring function and being connected to a host computer and a storage device, comprising the steps of:

beforehand, mirroring source data in a source volume as a snapshot target, thereby creating mirror data in the source volume containing the source data, wherein when creating a mirror of a file including data stored in storage areas that are distributed non-sequentially in the source volume, the mirror data are configured of storage areas of sequential data blocks in the source volume;

synchronizing the mirror data with the source data of the snapshot target in the source volume;

stopping the synchronization of the mirror data in the source volume after a snapshot creation command is issued from a management computer, and copying contents of the mirror data from the source volume into a snapshot volume;

overwriting, when a write request is issued to write data in the source data in the source volume, data in the source data in the source volume in parallel with said step of copying contents of the mirror data from the source volume into the snapshot volume;

synchronizing the source data thus overwritten with the mirror data in the source volume after the copying into the snapshot volume is completed; and recording information items including a data start position in the source volume of the sequential data blocks of the mirror data to be copied from the source volume into the snapshot volume, a data start position in the snapshot volume as a copy destination, and a data length of the sequential data blocks in the source volume in a copy correspondence table, with a correspondence between the data start position of the sequential data blocks in the source volume, the data start position in the snapshot volume, and the data length of the sequential data blocks;

wherein said step of copying the contents of the mirror data from the source volume into the snapshot volume, is performed by referring to the copy correspondence table, thereby copying the contents of the mirror data beginning at the data start position in the source volume into the snapshot volume at the copy destination beginning at the data start position in the snapshot volume, the mirror data to be copied having the data length in the source volume recorded in the copy correspondence table.

4. The method of acquiring a snapshot according to claim 3, further comprising the steps of:

reading, when a data read request is issued to read snapshot data from the snapshot volume, data from the snapshot volume if the snapshot target data is beforehand copied into the snapshot volume by the snapshot creation command; and changing a destination of the data read request if the snapshot target data is not copied yet into the snapshot volume, and reading the mirror data from the source volume.

5. The method of acquiring a snapshot according to claim 4, further comprising the step of:

during the step of reading the mirror data from the source volume when the destination of the data read request is changed because the snapshot target data is not copied yet into the snapshot volume, copying the read mirror data to the snapshot volume.

6. The method of acquiring a snapshot according to claim 3, further comprising the step of configuring, when the source volume includes a plurality of snapshot target files, sequential data blocks to store the files in sequential areas.

7. The method of acquiring a snapshot according to claim 3, further comprising a step of recording information in a copy completion map, indicating whether each data block of the mirror data to be copied has been copied already into the snapshot volume, wherein the stop of copying the contents of the mirror data from the source volume into the snapshot volume, refers to the copy completion map; skips each data block of the mirror data to be copied which is shown in the copy completion map to have been copied already into the snapshot volume; and copies each data block indicated not to have been copied already into the snapshot volume.

8. A computer-readable recording medium having stored therein a program product to execute a method of acquiring a snapshot in a storage switch having a snapshot acquiring function and being connected to a host computer and a storage device, wherein the method comprises the steps of:

beforehand, mirroring source data in a source volume as a snapshot target, thereby creating mirror data in the source volume containing the source data, wherein when creating a mirror of a file including data stored in storage areas that are distributed non-sequentially in the source volume, the mirror data are configured of storage areas of sequential data blocks in the source volume;

synchronizing the mirror data with the source data of the snapshot target in the source volume;

stopping the synchronization of the mirror data in the source volume after a snapshot creation command is issued from a management computer, and copying contents of the mirror data from the source volume into a snapshot volume;

overwriting, when a write request is issued to write data in the source data in the source volume, data in the source data in the source volume in parallel with said step of copying contents of the mirror data from the source volume into the snapshot volume;

synchronizing the source data thus overwritten with the mirror data in the source volume after the copying into the snapshot volume is completed; and recording information items including a data start position in the source volume of the sequential data blocks of the mirror data to be copied from the source volume into the snapshot volume, a data start position in the snapshot volume as a copy destination, and a data length of the sequential data blocks in the source volume in a copy correspondence table, with a correspondence between the data start position of the sequential data blocks in the source volume, the data start position in the snapshot volume, and the data length of the sequential data blocks;

wherein said step of copying the contents of the mirror data from the source volume into the snapshot volume, is performed by referring to the copy correspondence table, thereby copying the contents of the mirror data beginning at the data start position in the source volume, into the snapshot volume at the copy destination beginning at the data start position in the snapshot volume, the mirror data to be copied having the data length in the source volume recorded in the copy correspondence table.

9. The computer-readable recording medium according to claim 8, wherein the method further comprises a step of recording information in a copy completion map, indicating whether each data block of the mirror data to be copied has been copied already into the snapshot volume, wherein the stop of copying the contents of the mirror data from the source volume into the snapshot volume, refers to the copy completion map; skips each data block of the mirror data to be copied which is shown in the copy completion map to have been copied already into the snapshot volume; and copies each data block indicated not to have been copied already into the snapshot volume.

10. A storage switch having a backup acquiring function and being connected to a host computer and a storage device, comprising:

a means which copies contents of a snapshot target tile in a source volume, thereby creating a mirror file in the source volume containing the snapshot target file, wherein when creating a mirror file of file data stored in storage areas that are distributed non-sequentially in the source volume, the mirror file is configured of storage areas of sequential data blocks in the source volume;

a means which copies contents of the snapshot target file in the source volume, updated in response to an access request from the host computer, into the mirror file in the source volume;

a means which copies, in response to a snapshot command from a management computer, the contents of the mirror tile from the source volume into a snapshot volume in parallel with writing of data into the snapshot target file in response to a write request thereto; and a means which records information items including a data position in the source volume of each of the blocks of the mirror file to be copied from the source volume into the snapshot volume, a data position thereof in the snapshot volume for the contents of the mirror file to be copied from the source volume into the snapshot volume, and a data length thereof in the source volume of the blocks of the mirror file to be copied from the source volume into the snapshot volume in a snapshot correspondence table, with a correspondence between the data position of each of the blocks in the source volume, the data position thereof in the snapshot volume, and the data length in the source volume of the data blocks;

wherein said means which copies the contents of the mirror file from the source volume into the snapshot volume in response to the snapshot command, refers to the snapshot correspondence table to copy the contents of the mirror file beginning at the data position in the source volume into the snapshot volume at a copy destination beginning at the data position thereof in the snapshot volume, the mirror file to be copied having the data length in the source volume recorded in the snapshot correspondence table.

11. The storage switch according to claim 10, further comprising a means which records information in a copy completion map, indicating whether each data block of the mirror file to be copied has been copied already into the snapshot volume, wherein the means which copies the contents of the mirror file from the source volume into the snapshot volume, refers to the copy completion map; skips each data block of the mirror file to be copied which is shown in the copy completion map to have been copied already into the snapshot volume; and copies each data block indicated not to have been copied already into the snapshot volume.

12. A method of acquiring a snapshot in a storage switch having a backup acquiring function and being connected to a host computer and a storage device, comprising the steps of:

beforehand, mirroring a data writing target original file in a source volume, thereby creating a mirror file in the source volume containing the data writing target original file, wherein when creating a mirror file of file data stored in storage areas that are distributed non-sequentially in the source volume, the mirror file is configured of storage areas of sequential data blocks in the source volume;

writing, when a write request is issued to write data in the original file in the source volume, data in the original file in the source volume;

copying contents of the mirror file from the source volume into a file in a snapshot volume according to a snapshot command from a management computer, in parallel with said step of writing data in the original file in the source volume in response to the write request;

writing the data written in the original file into the mirror file in the source volume; and recording information items including a data position in the source volume of each of the blocks of the mirror file to be copied from the source volume into the snapshot volume, a data position thereof in the snapshot volume for the contents of the mirror file to be copied from the source volume into the snapshot volume, and a data length thereof in the source volume of the blocks of the mirror file to be copied from the source volume into the snapshot volume in a snapshot correspondence table, with a correspondence between the data position of each of the blocks in the source volume, the data position thereof in the snapshot volume, and the data length in the source volume of the data blocks;

wherein said step of copying the contents of the mirror file from the source volume into the file in the snapshot volume according to the snapshot command, is performed by referring to the snapshot correspondence table, thereby copying the contents of the mirror file beginning at the data position in the source volume, into the snapshot volume at a copy destination beginning at the data position thereof in the snapshot volume, the mirror file to be copied having the data length in the source volume recorded in the snapshot correspondence table.

13. The method of acquiring a snapshot according to claim 12, further comprising the steps of:

reading, when a data read request is issued to read a file from the snapshot volume, the file from the snapshot volume if data in the file in the snapshot volume is beforehand copied by the snapshot acquiring command; and changing a destination of the data read request if the data is not copied yet, and reading data of the mirror file from the source volume.

14. The method of acquiring a snapshot according to claim 13, further comprising the step of:

during the step of reading the data of the mirror file from the source volume when the destination of the data read request is changed because the data in the file in the snapshot volume is not copied yet into the snapshot volume, copying the read data of the mirror file to the snapshot volume.

15. The method of acquiring a snapshot according to claim 12, wherein an application program product executed on the host computer uses a plurality of files, further comprising the step of configuring the data blocks to store the files in sequential areas.

16. The method of acquiring a snapshot according to claim 12, further comprising a step of recording information in a copy completion map, indicating whether each data block of the mirror file to be copied has been copied already into the snapshot volume, wherein the stop of copying the contents of the mirror file from the source volume into the snapshot volume, refers to the copy completion map; skips each data block of the mirror file to be copied which is shown in the copy completion map to have been copied already into the snapshot volume; and copies each data block indicated not to have been copied already into the snapshot volume.

17. A computer-readable recording medium having stored a program product to execute a method of acquiring a snapshot in a storage switch having a backup acquiring function and being connected to a host computer and a storage device, wherein the method comprises the steps of:

beforehand mirroring a data writing target original file in a source volume, thereby creating a mirror file in the source volume containing the data writing target original file, wherein when creating a mirror file of file data stored in storage areas that are distributed non-sequentially in the source volume, the mirror file is configured of storage areas of sequential data blocks in the source volume; writing, when a write request is issued to write data in the original file in the source volume, data in the original file in the source volume;

copying contents of the mirror file from the source volume into a file in a snapshot volume according to a snapshot command from a management computer, in parallel with said step of writing data in the original file in the source volume in response to the write request;

writing the data written in the original file into the mirror file in the source volume; and recording information items including a data position in the source volume of each of the blocks of the mirror file to be copied from the source volume into the snapshot volume, a data position thereof in the snapshot volume for the contents of the mirror file to be copied from the source volume into the snapshot volume, and a data length thereof in the source volume of the blocks of the mirror file to be copied from the source volume into the snapshot volume in a snapshot correspondence table, with a correspondence between the data position of each of the blocks in the source volume, the data position thereof in the snapshot volume and the data length in the source volume of the data blocks;

wherein said step of copying the contents of the mirror file from the source volume into the file in the snapshot volume according to the snapshot command, is performed by referring to the snapshot correspondence table, thereby copying the contents of the mirror file beginning at the data position in the source volume, into the snapshot volume at a copy destination beginning at the data position thereof in the snapshot volume, the mirror file to be copied having the data length in the source volume recorded in the snapshot correspondence table.

18. The computer-readable recording medium according to claim 17, wherein the method further comprises a step of recording information in a copy completion map, indicating whether each data block of the mirror file to be copied has been copied already into the snapshot volume, wherein the stop of copying the contents of the mirror file from the source volume into the snapshot volume, refers to the copy completion map; skips each data block of the mirror file to be copied which is shown in the copy completion map to have been copied already into the snapshot volume; and copies each data block indicated not to have been copied already into the snapshot volume.

19. A storage switch having a backup acquiring function and being connected to a host computer and a storage device, comprising:

a means which copies contents of a snapshot target file in a source volume, thereby creating copy contents in storage areas that are distributed non-sequentially in the source volume containing the snapshot target file, and which creates a mirror file from the copy contents non-sequentially distributed, the mirror file being configured of sequential storage areas in the source volume containing the snapshot target file, wherein when creating a mirror file of file data stored in storage areas that are distributed non-sequentially in the source volume, the mirror file is configured of storage areas of sequential data blocks in the source volume;

a means which copies contents of the snapshot target file in the source volume, updated in response to an access request from the host computer, into the mirror file in the source volume;

a means which copies, in response to a snapshot command from a control computer, the contents of the mirror file from the source volume into a snapshot volume in parallel with writing of data into the snapshot target file in response to a write request thereto; and a means which records information items including a data position in the source volume of each of the blocks of the mirror file to be copied from the source volume into the snapshot volume, a data position thereof in the snapshot volume for the contents of the mirror file to be copied from the source volume into the snapshot volume, and a data length thereof in the source volume of the blocks of the mirror file to be copied from the source volume into the snapshot volume in a snapshot correspondence table, with a correspondence between the data position of each of the blocks in the source volume, the data position thereof in the snapshot volume, and the data length of the data blocks in the source volume;

wherein said means which copies the contents of the mirror file from the source volume into the snapshot volume in response to the snapshot command, refers to the snapshot correspondence table to copy the contents of the mirror file beginning at the data position in the source volume into the snapshot volume at a copy destination beginning at the data position thereof in the snapshot volume, the mirror file to be copied having the data length in the source volume recorded in the snapshot correspondence table.

20. The storage switch according to claim 19, further comprising a means which records information in a copy completion map, indicating whether each data block of the mirror file to be copied has been copied already into the snapshot volume, wherein the means which copies the contents of the mirror file from the source volume into the snapshot volume, refers to the copy completion map; skips each data block of the mirror file to be copied which is shown in the copy completion map to have been copied already into the snapshot volume; and copies each data block indicated not to have been copied already into the snapshot volume.

* * * * *